(12) United States Patent
Yaguchi

(10) Patent No.: US 12,483,780 B2
(45) Date of Patent: Nov. 25, 2025

(54) APPARATUS, METHOD FOR APPARATUS, IMAGE CAPTURING APPARATUS, AND STORAGE MEDIUM FOR PROVIDING A NOTIFICATION OF BLUR OF A SUBJECT IN A CAPTURED IMAGE

(71) Applicant: CANON KABUSHIKI KAISHA, Tokyo (JP)

(72) Inventor: Hiroyuki Yaguchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 18/325,824

(22) Filed: May 30, 2023

(65) Prior Publication Data
US 2023/0396876 A1 Dec. 7, 2023

(30) Foreign Application Priority Data
Jun. 3, 2022 (JP) ................. 2022-091155

(51) Int. Cl.
*H04N 23/60* (2023.01)
*H04N 23/62* (2023.01)

(52) U.S. Cl.
CPC ............. *H04N 23/64* (2023.01); *H04N 23/62* (2023.01)

(58) Field of Classification Search
CPC ........ H04N 23/60; H04N 23/61; H04N 23/62; H04N 23/64; H04N 23/611; H04N 23/634; H04N 23/6811; H04N 23/635; H04N 23/675; H04N 23/687; H04N 5/144
See application file for complete search history.

(56) References Cited

U.S. PATENT DOCUMENTS

2020/0213497 A1* 7/2020 Kubo .................... H04N 23/689
2020/0213511 A1* 7/2020 Suzuki ................. H04N 23/634
2021/0084226 A1* 3/2021 Yaguchi .................. G06F 3/013

FOREIGN PATENT DOCUMENTS

JP          2008172667 A      7/2008

* cited by examiner

*Primary Examiner* — Kelly L Jerabek
(74) *Attorney, Agent, or Firm* — Canon U.S.A., Inc. IP Division

(57) ABSTRACT

An apparatus includes: an obtaining unit that obtains a plurality of first captured images obtained by performing first shooting with a first parameter and motion information about subjects in the plurality of first captured images; an estimation unit that, when second shooting is performed with a second parameter set independent of the first parameter, estimates motion blur of the subjects in a second captured image obtained in the second shooting, from the motion information and the second parameter; a notification unit that performs a notification process corresponding to information about the motion blur; a specifying unit that specifies a subject for which the notification process is performed; and a determination unit that determines a region for which the notification process is performed, based on the specified subject, in which the notification unit performs the notification process for the determined region.

17 Claims, 22 Drawing Sheets

FIG. 2
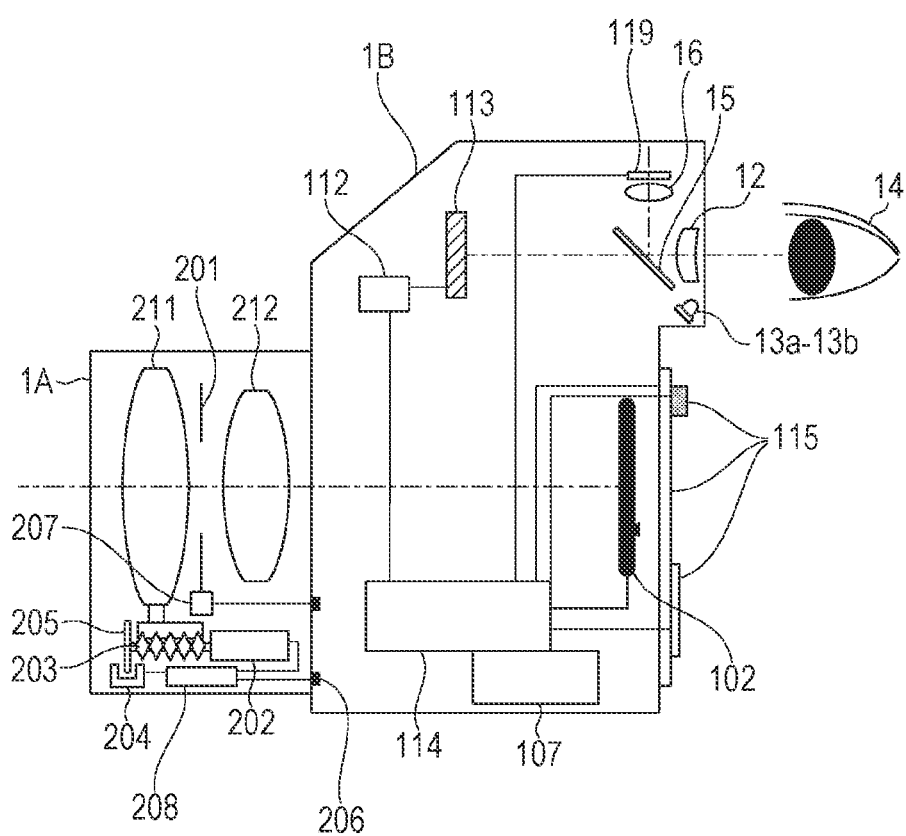
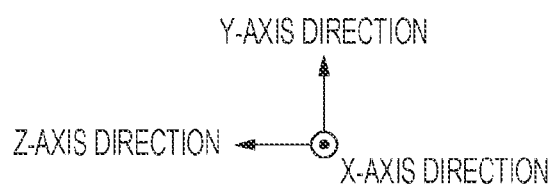

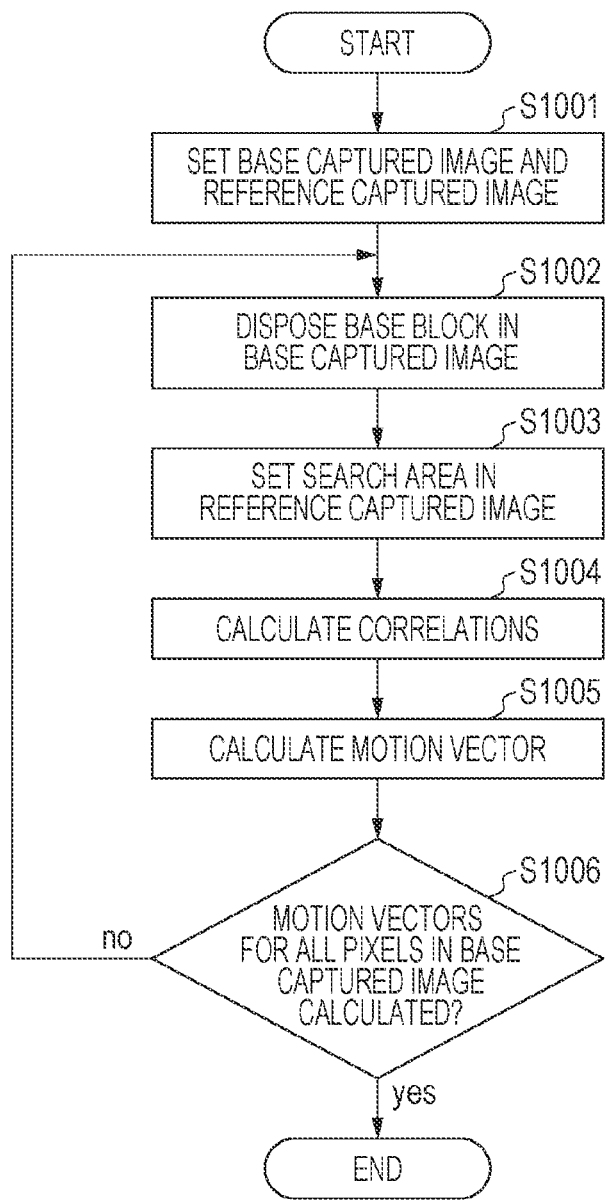

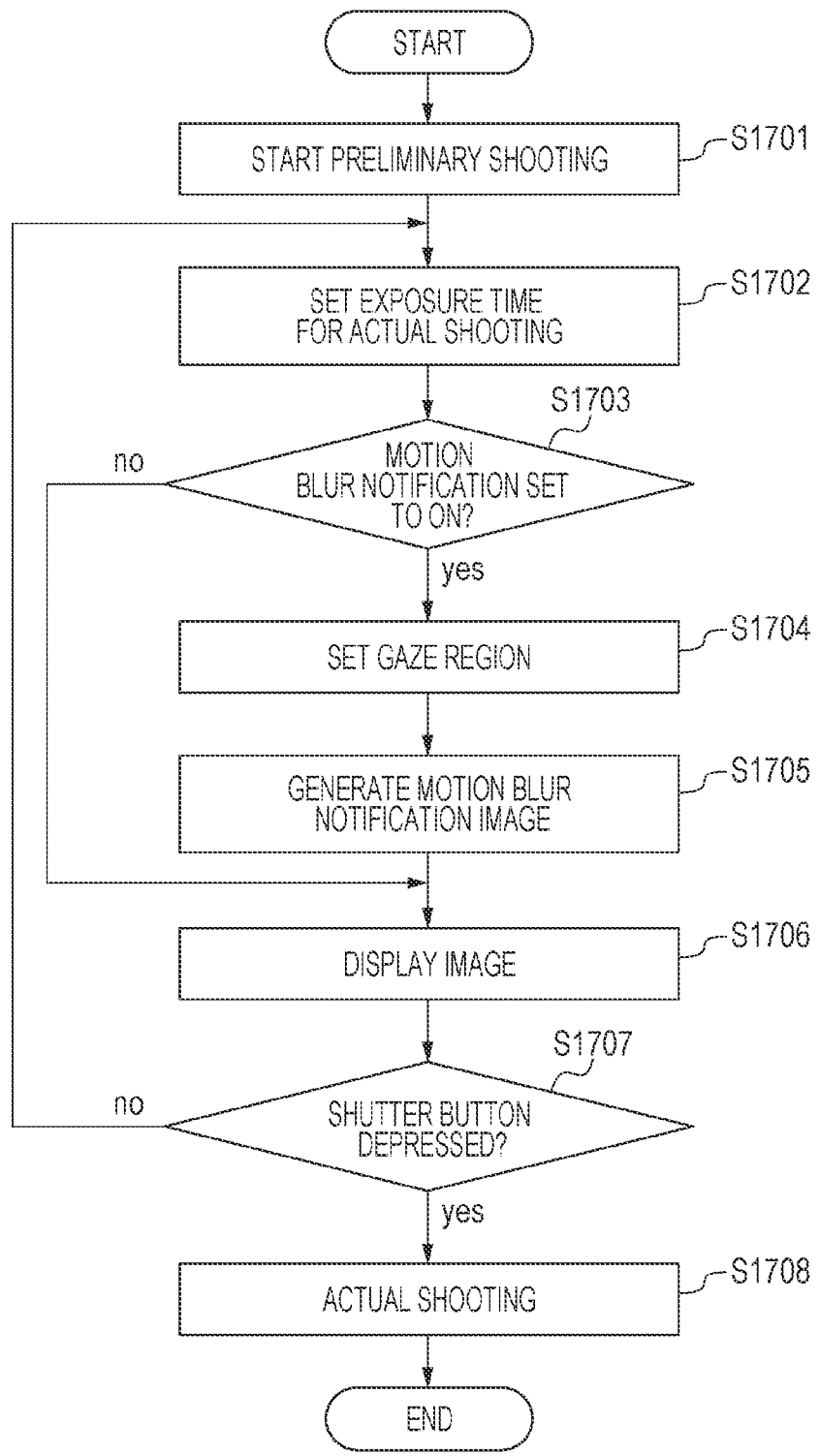

MOVEMENT RANGE OF GAZE REGION

| GAZE REGION POSITION | NUMBER OF PIXELS CORRESPONDING TO AMOUNT OF MOVEMENT [PIXELS] | VISIBILITY OF MOTION BLUR NOTIFICATION |
|---|---|---|
| GAZE REGION 1911 | 250 | HIGH |
| GAZE REGION 1912 | 1500 | LOW |
| GAZE REGION 1913 | 1800 | LOW |

GAZE DURATION FOR GAZE REGION

| GAZE REGION POSITION | GAZE DURATION [ms] | VISIBILITY OF MOTION BLUR NOTIFICATION |
|---|---|---|
| GAZE REGION 2011 | 6400 | HIGH |
| GAZE REGION 2012 | 500 | LOW |
| GAZE REGION 2013 | 3300 | MEDIUM |

APPARATUS, METHOD FOR APPARATUS, IMAGE CAPTURING APPARATUS, AND STORAGE MEDIUM FOR PROVIDING A NOTIFICATION OF BLUR OF A SUBJECT IN A CAPTURED IMAGE

BACKGROUND

Technical Field

The aspect of the embodiments relates to a technique for providing a notification of blur of a subject in a captured image.

Description of the Related Art

Some models of image capturing apparatuses such as digital still cameras have a shooting mode in which the shutter speed has priority (hereinafter referred to as "shutter-speed-priority mode"). In the shutter-speed-priority mode, a user who is taking a photograph sets a desired shutter speed and the image capturing apparatus automatically sets exposure settings, such as the f-number and the ISO speed, other than the shutter speed.

By using the shutter-speed-priority mode as described above, the user can take a photograph at a shutter speed of their preference. For example, when the user sets a high shutter speed before photographing and takes a photograph in the shutter-speed-priority mode, the user can capture an image with less motion blur.

Japanese Patent Laid-Open No. 2008-172667 discloses a technique for detecting a motion region in time-series images captured during preliminary shooting and highlighting the motion region. The preliminary shooting is shooting in which the user determines composition and sets shooting conditions while looking through or at the electronic viewfinder or the rear liquid crystal display of the image capturing apparatus before actual shooting. The actual shooting is shooting in which the image capturing apparatus is made to perform shooting based on the composition and the shooting conditions determined or set in the preliminary shooting, in response to, for example, an action of the user depressing the shutter button. According to Japanese Patent Laid-Open No. 2008-172667, the user can visually confirm a motion region during the preliminary shooting.

According to Japanese Patent Laid-Open No. 2008-172667, it is possible to detect a motion region in time-series images captured during preliminary shooting and highlight the motion region to thereby encourage the user to take an action for reducing blur. However, Japanese Patent Laid-Open No. 2008-172667 does not take into consideration that a photograph is to be taken at an appropriate frame rate and an appropriate shutter speed in accordance with the speed and amount of movement of the subject in order to extract a motion region in time-series images.

SUMMARY

An apparatus according to an aspect of the embodiments includes: one or more processors; and a memory storing instructions which, when executed by the one or more processors, cause the one or more processors to function as: an obtaining unit configured to obtain a plurality of first captured images obtained by performing first shooting with a first parameter and motion information about subjects in the plurality of first captured images; an estimation unit configured to, when second shooting is performed with a second parameter set independent of the first parameter, estimate motion blur of the subjects in a second captured image obtained in the second shooting, from the motion information and the second parameter; a notification unit configured to perform a notification process corresponding to information about the motion blur; a specifying unit configured to specify a subject, among the subjects, for which the notification process is performed; and a determination unit configured to determine a region for which the notification process is performed, based on the specified subject, in which the notification unit is configured to perform the notification process for the determined region.

A method for an apparatus according to an aspect of the embodiments includes: obtaining a plurality of first captured images obtained by performing first shooting with a first parameter and motion information about subjects in the plurality of first captured images; estimating, when second shooting is performed with a second parameter set independent of the first parameter, motion blur of the subjects in a second captured image obtained in the second shooting, from the motion information and the second parameter; performing a notification process corresponding to information about the motion blur; specifying a subject, among the subjects, for which the notification process is performed; and determining a region for which the notification process is performed, based on the specified subject, in which the notification process is performed for the determined region.

Further features of the disclosure will become apparent from the following description of exemplary embodiments with reference to the attached drawings.

BRIEF DESCRIPTION OF THE DRAWINGS

FIG. 2 is a cross sectional view of the housing of the image capturing apparatus according to the embodiments of the disclosure.

FIG. 10 is a diagram illustrating a process flow in a motion vector calculation unit.

FIG. 17 is a diagram illustrating an image capturing process flow according to a third embodiment of the disclosure.

DESCRIPTION OF THE EMBODIMENTS

Figure 1:
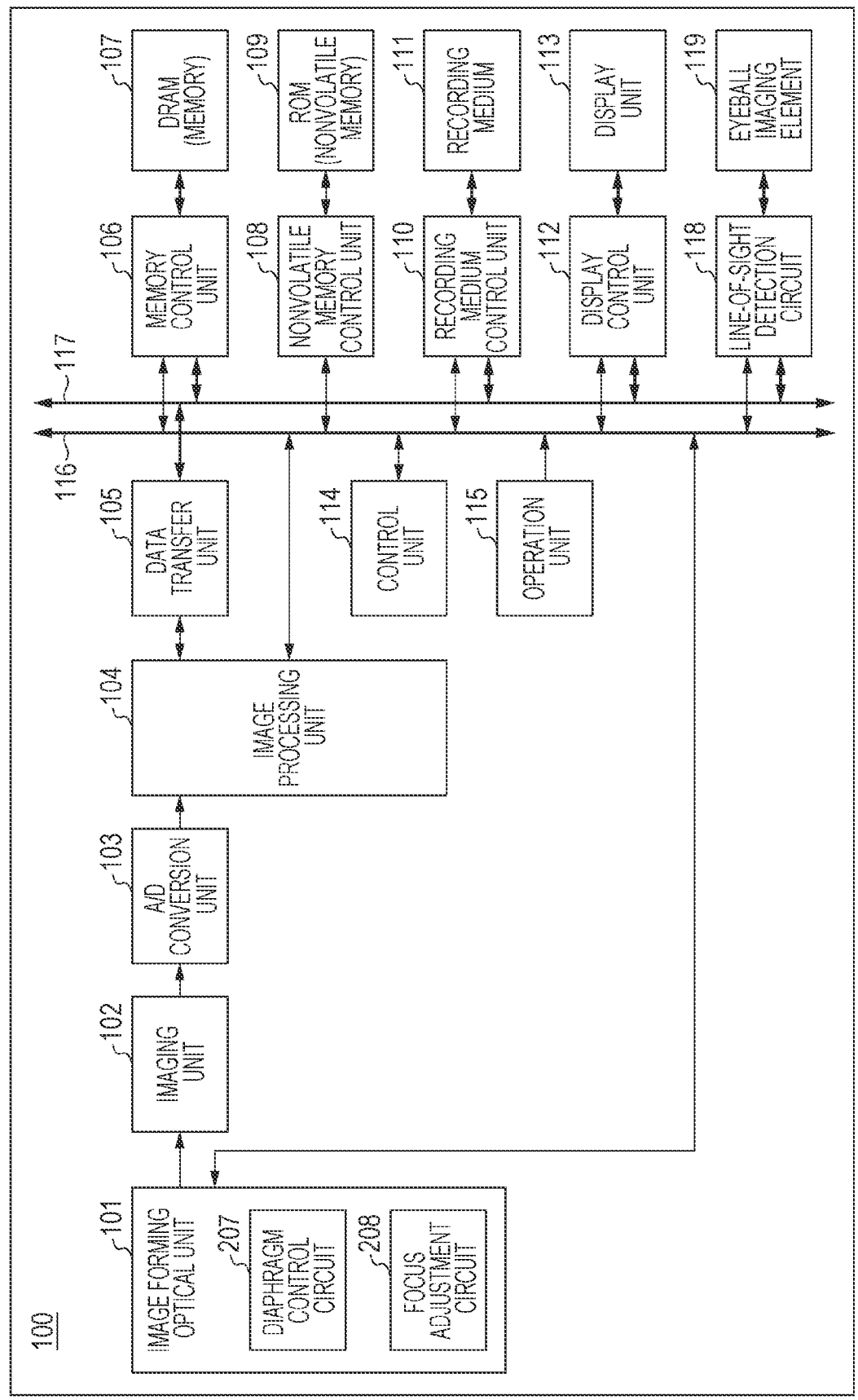
FIG. 1 is a block diagram of an image capturing apparatus according to embodiments of the disclosure.

Hereinafter, embodiments of the disclosure will be described with reference to the attached drawings. Note that the following embodiments are not intended to limit the disclosure according to the claims. Although a plurality of features are described in the embodiments, all of the plurality of features are not essential to the disclosure and any of the plurality of features may be combined. In the attached drawings, the same or similar configurations are assigned the same reference numerals, and a duplicated description thereof is omitted.

In Japanese Patent Laid-Open No. 2008-172667, the speed or amount of movement of the subject is not taken into consideration upon extraction of a motion region in time-series images. For example, when a user photographs a runner in a race in the shutter-speed-priority mode so as to reduce motion blur, the user predicts the moving speed of the runner during preliminary shooting and sets a shutter speed that is likely to reduce motion blur of the runner. However, even when the user visually confirms an image displayed on the electronic viewfinder or the rear liquid crystal display during preliminary shooting, the user has considerable difficulty in checking whether motion blur occurs at a set shutter speed. When the shutter speed in actual shooting and that in preliminary shooting are different, motion blur occurring in the actual shooting and that occurring in the preliminary shooting are different, and therefore, the user has difficulty in confirming motion blur in the actual shooting even when the user visually confirms the image during preliminary shooting. Hereinafter, embodiments of the disclosure will be described that allow, during preliminary shooting, easy confirmation of motion blur that may occur in actual shooting, by limiting a notification region when a motion blur notification of motion blur in preliminary shooting is provided based on estimated motion blur equivalent to that in actual shooting.

FIG. 1 is a block diagram of an image capturing apparatus (digital camera 100) that is an example of an information processing apparatus according to embodiments of the disclosure. In the embodiments described above, an example where the disclosure is applied to a digital camera that is an image capturing apparatus and that is an example of the information processing apparatus will be described. The information processing apparatus in the disclosure is applicable to any electronic device that can process a captured image. Examples of the electronic device include a mobile phone, a game machine, a tablet terminal, a personal computer, and information terminals of a wristwatch type, an eyeglass type, and a head-mounted display type.

An image forming optical unit 101 is constituted by a group of a plurality of lens including a zoom lens, a focus lens, and an anti-shake lens and includes a diaphragm. Upon shooting, the image forming optical unit 101 makes a focus adjustment with a focus adjustment circuit 208 included therein and makes an exposure adjustment, a blur correction, and so on with a diaphragm control circuit 207 included therein to thereby form an optical image on an imaging plane of an imaging unit 102.

The imaging unit 102 has a photoelectric conversion function of converting an optical image to an electric signal (analog image signal) and is constituted by a CCD or complementary metal-oxide semiconductor (CMOS) sensor and so on. The optical image formed on the imaging plane of the imaging unit 102 is photo-electrically converted and the obtained analog signal is output to an analog/digital (A/D) conversion unit 103.

The A/D conversion unit 103 converts the input analog image signal to digital image data. The digital image data is temporarily stored in a dynamic random access memory (DRAM) 107 described below.

An image processing unit 104 is constituted by various image processing units, a buffer memory, and so on and performs various types of image processing for the image data stored in the DRAM 107. For example, the image processing unit 104 appropriately performs processes including a chromatic-aberration-of-magnification correction, a development process, a noise reduction process, geometric deformation, and resizing such as enlargement or reduction. The image processing unit 104 includes a captured-image correction unit that appropriately makes a pixel correction, a black level correction, a shading correction, a defect correction, and so on for the image data obtained by conversion by the A/D conversion unit 103. The image processing unit 104 further includes a motion blur notification image generation unit 300 described below. The motion blur notification image generation unit 300 generates an image plane with which motion blur can be easily confirmed, based on the obtained information about motion blur of the subject and superimposes the image plane on an image stored in the DRAM 107 to thereby generate an image (motion blur notification image) for a motion blur notification.

The image processing unit 104 includes a detection unit (subject detection unit) for detecting a subject region and detects a main subject region from a captured image. The image processing unit 104 can perform meaning-based region division for a subject. For example, the image processing unit 104 can divide a person into specific parts (specific regions) including the trunk, arms, and legs and can also divide various subjects including an animal and a vehicle into specific parts. The detection unit for detecting a subject region and a division unit for division into meaning-based regions use existing methods using, for example, machine learning, and therefore, descriptions thereof are omitted.

A data transfer unit 105 is constituted by a plurality of direct memory access controllers (DMACs) that transfer data.

The DRAM (memory) 107 is a memory that stores data, and has a sufficient storage capacity for storing data of, for example, a predetermined number of still images and moving images and sound for a predetermined time length, and constants, programs, and so on for operations of a control unit 114. The DRAM 107 is also used when, for example, the control unit 114 described below loads a program.

A memory control unit 106 writes and reads data to and from the DRAM 107 in accordance with an instruction from the control unit 114 or the data transfer unit 105. A nonvolatile memory control unit 108 writes and reads data to and from a read-only memory (ROM) (nonvolatile memory) 109 in accordance with an instruction from the control unit 114.

The ROM 109 is an electrically erasable and recordable memory and is, for example, an electrically erasable, programmable read-only memory (EEPROM). In the ROM 109, constants, programs, and so on for operations of the control unit 114 are stored.

A recording medium 111 is a recording medium such as a Secure Digital (SD) card and is controlled by a recording medium control unit 110, and image data is recorded thereto and record data is read therefrom.

A display unit 113 includes a display device such as a liquid crystal display (LCD) and displays an image stored in the DRAM 107 or an image recorded to the recording medium 111 in accordance with control by a display control unit 112. The display unit 113 also displays, for example, an operation user interface for accepting a user instruction. The display unit 113 may include a plurality of display devices including an electronic viewfinder (EVF) and a rear monitor provided on a side facing the user (rear side). The display unit 113 is controlled by the display control unit 112 and can process and display image data input from the A/D conversion unit 103 in real time before capturing of a still image or during capturing of a moving image.

An operation unit 115 is an input interface that includes various physical operation members such as switches, buttons, and a touch panel operated by the user and accepts an instruction input by the user.

The control unit 114 is, for example, a central processing unit (CPU), reads a control program for various functional blocks included in the digital camera 100 from the ROM 109, loads the control program to the DRAM 107, and executes the control program. The control unit 114 also performs arithmetic operations that are required in various control processes. The control unit 114 controls the image processing unit 104, the data transfer unit 105, the memory control unit 106, the nonvolatile memory control unit 108, the recording medium control unit 110, the display control unit 112, the operation unit 115, and the imaging unit 102 via a bus 116. The control unit 114 executes programs recorded to the ROM 109 to thereby implement various processes in the embodiments. The control unit 114 further controls the lenses and diaphragm of the image forming optical unit 101 and obtains information including the focal length.

The bus 116 is a system bus for mainly transmitting control signals for blocks from the control unit 114 and so on, and a bus 117 is a data bus for mainly transferring image data.

The digital camera 100 performs preliminary shooting (live view shooting) in which analog image signals successively output from the imaging unit 102 and passing through the A/D conversion unit 103, the DRAM 107, the image processing unit 104, and the display unit 113 are successively displayed on the display device in accordance with control by the control unit 114. Here, preliminary shooting is defined as shooting in which the user determines composition and sets shooting conditions while looking through or at the electronic viewfinder or the rear liquid crystal display of the image capturing apparatus before actual shooting. Actual shooting is defined as shooting in which the image capturing apparatus is made to capture a record image based on the composition and shooting conditions determined or set in preliminary shooting, in response to an action of the user depressing the shutter button. According to Japanese Patent Laid-Open No. 2008-172667, the user can visually confirm a motion region during preliminary shooting. In preliminary shooting, the user can prepare for shooting, that is, can determine composition and change shooting parameters for actual shooting, such as the exposure time (Tv value), the f-number (Av value), and the ISO speed, for actual shooting intended for, for example, recording to a recording medium and outputting to an external apparatus.

FIG. 2 is a cross sectional view of the housing of the digital camera 100 according to the embodiments of the disclosure and is an explanatory diagram illustrating an overall configuration. In FIG. 1 and FIG. 2, corresponding parts are indicated by the same numbers.

In FIG. 2, an image capturing lens 1A is a lens for interchangeable lens cameras. In this embodiment, although the image capturing lens 1A includes two lenses 211 and 212 therein for the sake of convenience, the image capturing lens 1A may be constituted by a larger number of lens. A housing unit 1B is the housing of the camera body and includes the following units therein. The imaging unit 102 is disposed on an expected plane on which the image capturing lens 1A of the digital camera 100 forms an image. An eyepiece lens 12 for observing a subject image displayed on the display unit 113 is disposed.

Light sources 13a and 13b illuminate an eyeball 14 of the user to detect the line-of-sight direction from the relationships between the pupil and reflection images of the light sources resulting from corneal reflection, are infrared light-emitting diodes, and are disposed around the eyepiece lens 12. An eyeball image of the illuminated eyeball and images of the light sources 13a and 13b resulting from corneal reflection pass through the eyepiece lens 12, are reflected by a light separator 15, and are formed on an eyeball imaging element 119 by a light receiving lens 16, the eyeball imaging element 119 being an array of photoelectric elements such as CCDs disposed in two dimensions. The light receiving lens 16 positions the pupil of the eyeball 14 of the user and the eyeball imaging element 119 so as to have a conjugate image-forming relationship. From the positional relationship between the eyeball image and the images of the light sources 13a and 13b resulting from corneal reflection, which are formed on the eyeball imaging element 119, the control unit 114 detects the line-of-sight direction with a predetermined algorithm described below.

The image capturing lens 1A includes a diaphragm 201, the diaphragm control circuit 207, a lens driving motor 202, a lens driving member 203 constituted by a driving gear and so on, and a photocoupler 204 therein. The photocoupler 204 detects rotation of a pulse board 205 that moves in conjunction with the lens driving member 203 and transmits the rotation to the focus adjustment circuit 208. The focus adjustment circuit 208 drives the lens driving motor 202 by a predetermined amount based on the information about the rotation and information about the lens driving amount from the camera to move the image capturing lens 1A to the in-focus position. A mount contact 206 is a publicly known interface between a camera and a lens.

In the operation unit 115 described above, operation members including a touch-panel liquid crystal display, a shooting assist button, and a button-type cross key are disposed and used in, for example, control based on a shooting assist operation described below. By touching the touch-panel liquid crystal display, the user can specify an image region and move an autofocus (AF) frame. Similar settings can be made with the button-type cross key.

Figure 3:
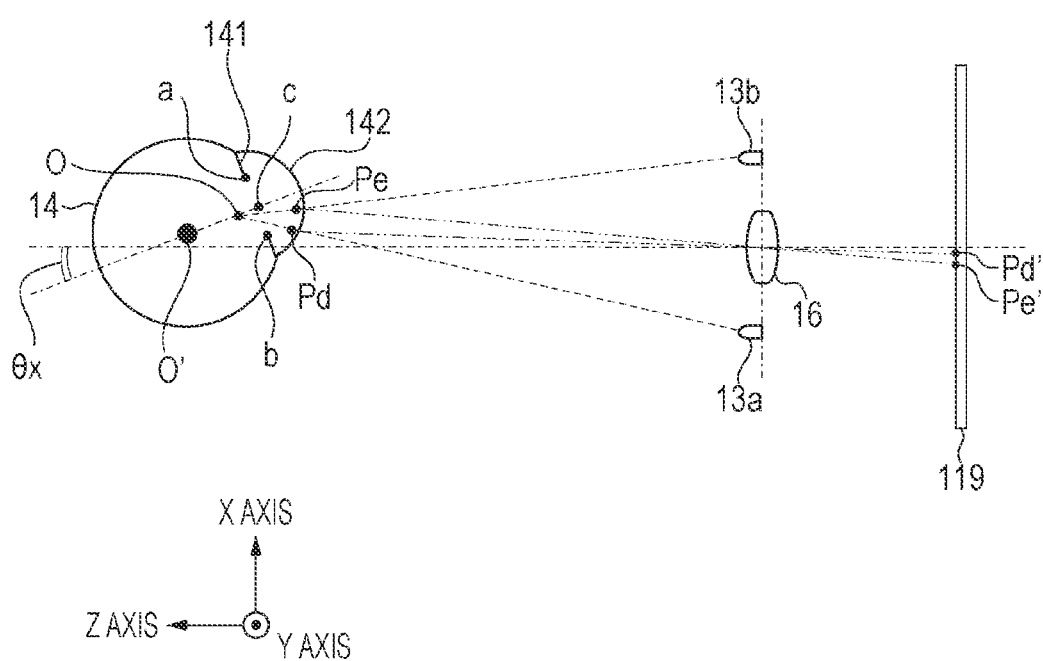
FIG. 3 is a diagram for explaining the principle of a line-of-sight detection method provided in the image capturing apparatus according to the embodiments of the disclosure.

FIG. 3 is a diagram for explaining the principle of a line-of-sight detection method and corresponds to a simplified diagram of an optical system for line-of-sight detection. In FIG. 3, the light sources 13a and 13b are light sources such as light-emitting diodes that emit, for example, infrared rays not sensed by the observer, and the light sources 13a and 13b are disposed so as to be substantially symmetric about the optical axis of the light receiving lens 16 and illuminate the eyeball 14 of the observer. The illumination rays reflected on the cornea of the eyeball 14 are partially condensed onto the eyeball imaging element 119 by the light receiving lens 16, and the line-of-sight direction can be detected from the positional relationship of the condensed rays.

Figure 4A:
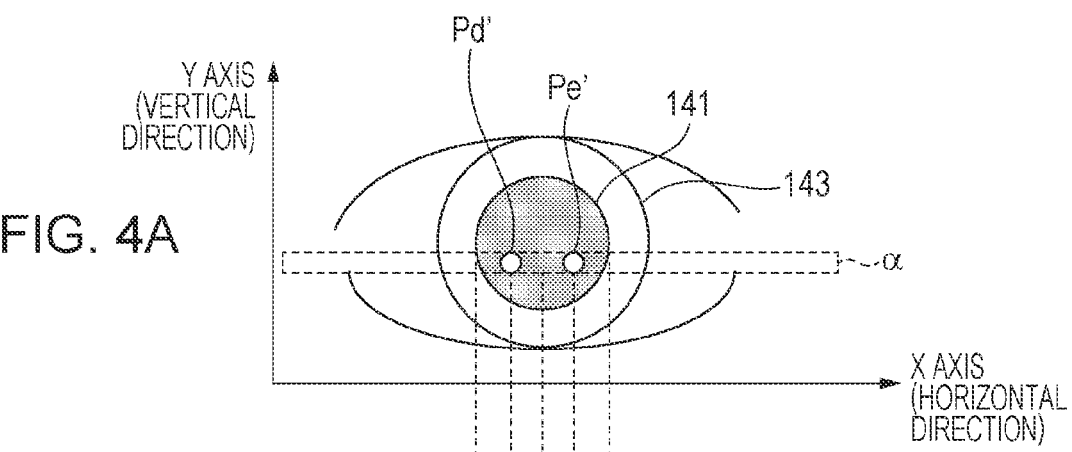
FIG. 4A is a schematic diagram of an eyeball image projected onto an eyeball imaging element.
Figure 4B:
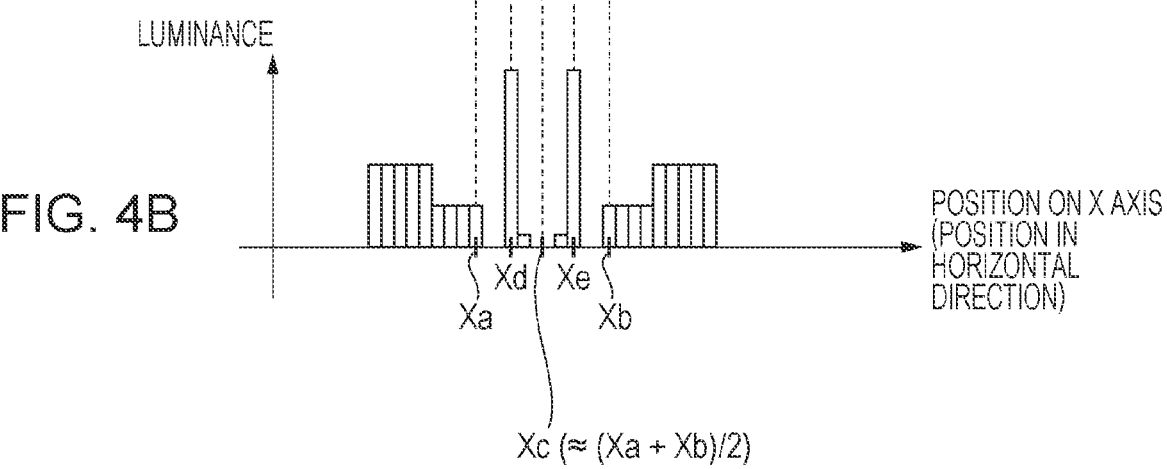
FIG. 4B is a diagram illustrating the charge-coupled device (CCD) output intensity of the eyeball imaging element.
Figure 5:
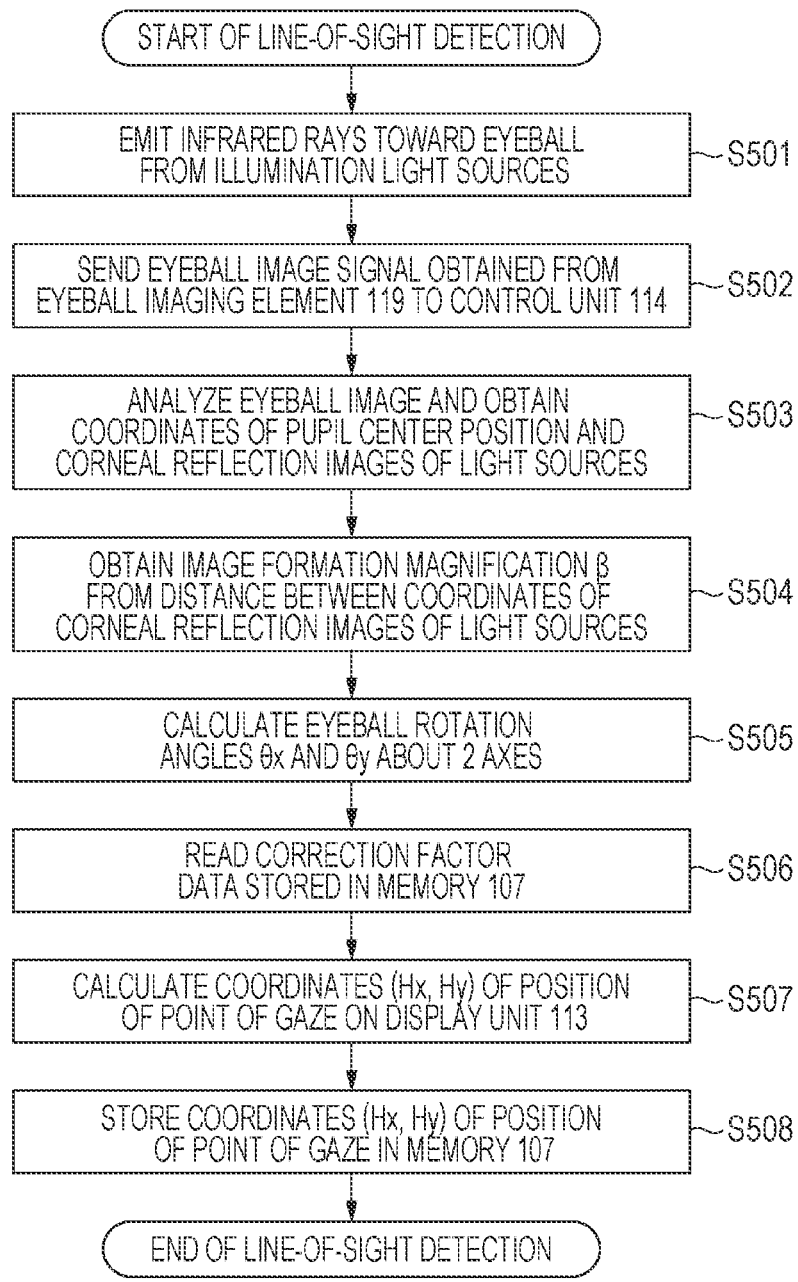
FIG. 5 is a schematic flow of a line-of-sight detection routine provided in the image capturing apparatus according to the embodiments of the disclosure.

FIG. 4A is a schematic diagram of an eyeball image projected onto the eyeball imaging element 119, and FIG. 4B is a diagram illustrating the CCD output intensity of the eyeball imaging element 119. FIG. 5 is a schematic flow of a line-of-sight detection routine.

With reference to FIG. 3 to FIG. 5, a line-of-sight detection unit (gaze region detection unit) will be described.
Description of Line-of-Sight Detection Operation In FIG. 5, when the line-of-sight detection routine starts, the light sources 13a and 13b emit infrared rays toward the eyeball 14 of an observer in step S501. An eyeball image of the eyeball of the observer illuminated with the infrared rays is formed on the eyeball imaging element 119 through the light receiving lens 16 and is photo-electrically converted by the eyeball imaging element 119 so that the eyeball image can be processed as an electric signal.

In step S502, the eyeball image signal obtained from the eyeball imaging element 119 as described above is sent to the control unit 114.

In step S503, a line-of-sight detection circuit 118 illustrated in FIG. 1 obtains information about the eyeball image signal sent to the control unit in S502 and calculates the coordinates of points corresponding to corneal reflection images Pd and Pe of the light sources 13a and 13b and a pupil center c illustrated in FIG. 3. The infrared rays emitted from the light sources 13a and 13b illuminate a cornea 142 of the eyeball 14 of the observer. At this time, the corneal reflection images Pd and Pe formed of the infrared rays partially reflected on the surface of the cornea 142 are condensed by the light receiving lens 16 and are formed on the eyeball imaging element 119 (the points Pd' and Pe' in FIG. 3). Similarly, light rays from end portions a and b of a pupil 141 form images on the eyeball imaging element 119. FIG. 4A illustrates an example reflection image obtained from the eyeball imaging element 119, and FIG. 4B illustrates example luminance information, for a region α in the example image, obtained from the eyeball imaging element 119. As illustrated in FIG. 4A, the horizontal direction is represented by the X axis, and the vertical direction is represented by the Y axis. Here, the coordinates of the formed images Pd' and Pe', in the X-axis direction (horizontal direction), resulting from the corneal reflection images of the light sources 13a and 13b are denoted by Xd and Xe respectively. The coordinates of images a' and b', in the X-axis direction, formed of light rays from the end portions a and b of the pupil 141 are denoted by Xa and Xb respectively. In the example luminance information in FIG. 4B, at the positions Xd and Xe corresponding to the images Pd' and Pe' resulting from the corneal reflection images of the light sources 13a and 13b, an extremely high luminance level is obtained. In a region between the coordinates Xa and Xb corresponding to the region of the pupil 141, an extremely low luminance level is obtained except for the positions of the Xd and Xe. In a region of X coordinates having values less than Xa and in a region of X coordinates having values greater than Xb, the regions corresponding to the region of an iris 143 outside the pupil 141, values intermediate between the two luminance levels are obtained. From information about the different luminance levels corresponding to the above-described X coordinate positions, the X coordinates Xd and Xe of the images Pd' and Pe' resulting from the corneal reflection images of the light sources 13a and 13b and the X coordinates Xa and Xb of the images a' and b' of the pupil end portions can be obtained. When the rotation angle $\theta x$ of the optical axis of the eyeball 14 relative to the optical axis of the light receiving lens 16 is small, the coordinate Xc of the location (denoted by c') at which an image of the pupil center c is formed on the eyeball imaging element 119 and which corresponds to the pupil center c can be expressed by $Xc \approx (Xa+Xb)/2$. Accordingly, the X coordinate of c' at which the image is formed on the eyeball imaging element 119 and which corresponds to the pupil center and the coordinates of the corneal reflection images Pd' and Pe' of the light sources 13a and 13b can be estimated.

In step S504, the line-of-sight detection circuit 118 calculates the image formation magnification $\beta$ of the eyeball image. $\beta$ is a magnification determined based on the position of the eyeball 14 relative to the light receiving lens 16 and can be practically calculated as a function of the interval (Xd−Xe) between the corneal reflection images Pd' and Pe'.

In step S505, the line-of-sight detection circuit 118 calculates the rotation angle $\theta x$ of the optical axis of the eyeball 14 in the Z-X plane by using the fact that the X coordinate of the middle point between the corneal reflection images Pd and Pe and the X coordinate of the center of curvature O of the cornea 142 substantially coincide with each other.

When the average distance from the center of curvature O of the cornea 142 to the center c of the pupil 141 is denoted by Oc, the rotation angle $\theta x$ of the optical axis of the eyeball 14 in the Z-X plane can be calculated from the relational expression $\beta * Oc * \sin \theta x \approx \{(Xd+Xe)/2\} - Xc$.

Although FIG. 3 and FIGS. 4A and 4B illustrate an example where the rotation angle $\theta x$ when the eyeball of the observer rotates in a plane perpendicular to the Y axis is calculated, a rotation angle $\theta y$ when the eyeball of the observer rotates in a plane perpendicular to the X axis is similarly calculated.

After the rotation angles $\theta x$ and $\theta y$ of the optical axis of the eyeball 14 of the observer are calculated in S505, in step S507, $\theta x$ and $\theta y$ are used to calculate the position of the line of sight of the observer on the display unit 113 (the position of a point at which the observer is gazing, hereinafter referred to as "point of gaze"). When the position of the point of gaze is expressed by coordinates (Hx, Hy) corresponding to the center c of the pupil 141 on the display unit 113, Hx and Hy can be calculated as follows.

$$Hx = m \times (Ax \times \theta x + Bx)$$

$$Hy = m \times (Ay \times \theta y + By)$$

Here, the factor m is a constant determined based on the configuration of the finder optical system of the camera and is a conversion factor for converting the rotation angles θx and θy to the coordinates of a position corresponding to the center c of the pupil 141 on the display unit 113. The factor m is determined in advance and stored in the memory 107. Ax, Bx, Ay, and By are line-of-sight correction factors for correcting the line of sight of the observer that differs among individuals, are obtained by performing a calibration operation described below, and are stored in the memory 107 before the start of the line-of-sight detection routine.

As described above, after the line-of-sight detection circuit 118 has calculated the coordinates (Hx, Hy) of the center c of the pupil 141 on the display unit 113, the coordinates are stored in the memory 107 in step S508, and the line-of-sight detection routine ends. The control unit 114 measures a duration in which the line of sight remains directed to a specific region and stores the duration in the memory 107 as a gaze duration.

Although the coordinates of the point of gaze on the display element are obtained by using corneal reflection images of the light sources 13a and 13b in the method described above, the disclosure is not limited to the method, and any method for obtaining the eyeball rotation angles from a captured eyeball image is applicable to the disclosure.

Although the method for obtaining the coordinates of the point of gaze has been described above, a region within a specific distance of the point of gaze indicated by the obtained coordinates may be specified as a gaze region.

Based on the obtained coordinates of the point of gaze, a line-of-sight marker indicating the result of detection of the line of sight may be displayed on the display device of the display unit 113 based on the control by the display control unit 112. For example, the line-of-sight marker can be superimposed and displayed on each of the pieces of image data displayed on the display unit 113 one after another, such that the position of the point of gaze is updated. That is, the line-of-sight detection routine described above is repeatedly executed, and the display control unit 112 displays on the display unit 113, an image obtained by superimposing the line-of-sight marker corresponding to each of the pieces of image data input from the A/D conversion unit 103 one after another.

The line-of-sight marker can have any color, shape, and size. The line-of-sight marker is, for example, a circle centered around the point of gaze indicated by the coordinates calculated in the line-of-sight detection routine described above, but is not limited to this example.

When the line-of-sight marker is superimposed on an image displayed on the display unit 113, the superimposition position need not be the position indicated by the coordinates of the point of gaze. For example, a method of using the average of a plurality of sets of coordinates of the point of gaze calculated by the line-of-sight detection circuit 118 using eyeball image signals obtained from the eyeball imaging element 119 during a specific period can be used. Accordingly, variation in the superimposition position of the line-of-sight marker caused by an error in line-of-sight detection or shifts in the line of sight of the observer can be reduced. The time taken to execute the line-of-sight detection routine once can be made shorter than the time taken to update an image displayed on the display unit 113 (update time). When the coordinates of the point of gaze is calculated a plurality of times while an image displayed on the display unit 113 is updated, the line-of-sight marker based on the average of the sets of coordinates of the point of gaze can be successively updated, superimposed, and displayed on an image displayed on the display unit 113. In one embodiment, the superimposition position of the line-of-sight marker need not be determined with the method described above, and a method that reduces an effect caused by an error in line-of-sight detection or shifts in the line of sight of the observer is desirable. For example, a method of excluding from calculation for determining the display position of the line-of-sight marker, a set of coordinates of the point of gaze that is apart from the other sets of coordinates of the point of gaze by a specific distance or more among a plurality of sets of coordinates of the point of gaze obtained during a specific period can be employed.

The line-of-sight detection unit (gaze region detection unit) according to the disclosure has been described above. The line-of-sight detection unit is not limited to this, and other existing methods may be used.

First Embodiment

Figure 6:
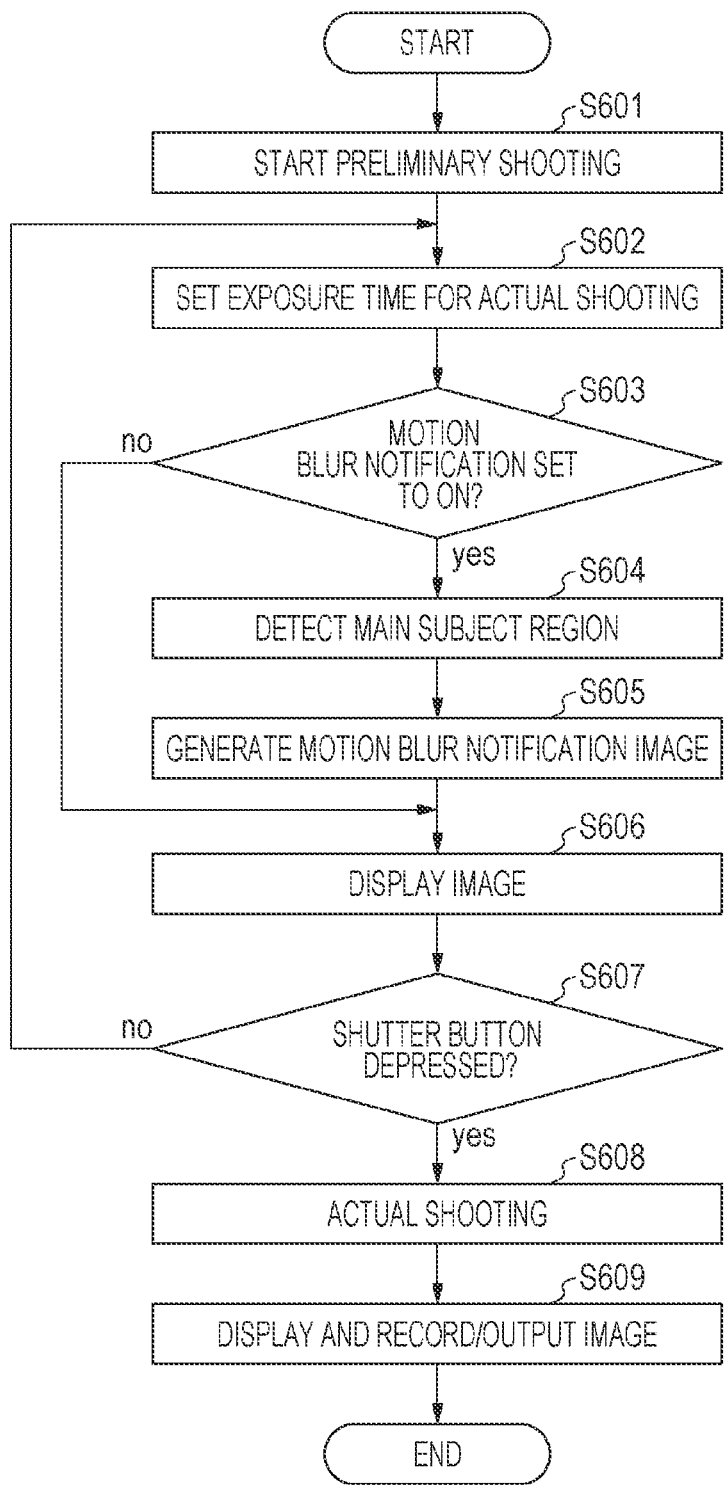
FIG. 6 is a diagram illustrating an image capturing process flow according to a first embodiment of the disclosure.

Processes in the digital camera 100 according to a first embodiment of the disclosure will be described in detail with reference to the flowchart in FIG. 6. The processes described below are implemented by the control unit 114 controlling the units of the digital camera 100 in accordance with a program stored in the ROM 109.

In step S601, the user turns on the power of the digital camera 100. In response to turn-on of the power of the digital camera 100, the control unit 114 controls the image forming optical unit 101 and the imaging unit 102 to start preliminary shooting in S601. During this period of preliminary shooting, the digital camera 100 successively captures and obtains images, and the obtained captured images are displayed on the display device of the display unit 113. The user can, for example, determine composition while looking at the images successively displayed during preliminary shooting. The processes in steps S602, S603, S604, S605, S606, and S607 described below are performed during the period of preliminary shooting. Here, an image captured during preliminary shooting is defined as a preliminarily captured image.

In step S602, the user uses the operation unit 115 to input shooting parameters for a simulation. The control unit 114 sets the shooting parameters for the simulation independent of shooting parameters for preliminary shooting in accordance with input from the operation unit 115. Here, the control unit 114 may, for example, automatically set shooting parameters that seem to be suitable for a detected subject model by using, for example, a publicly known image analysis or subject analysis. In this embodiment, the exposure time can be set as a shooting parameter for the simulation.

In this embodiment, the shooting parameter for the simulation set by the control unit 114 is used as a shooting parameter for actual shooting performed after detection of depressing of the shutter button (instruction for actual shooting) described below. However, this embodiment is not limited to this and may be configured such that the control unit 114 sets a parameter for actual shooting separately and independently based on a user instruction or automatically.

In step S603, the control unit 114 determines whether motion blur notification is set to ON or OFF. Motion blur notification may be set to ON or OFF by, for example, the user using the operation unit 115 or may be automatically set to ON or OFF based on some shooting conditions. A configuration may be employed that allows setting of ON or OFF with one physical operation member (for example, a button or a bar) or one icon on the touch device and allows the user to set ON or OFF at any timing during preliminary shooting. A configuration may be employed that allows periodical switching between ON and OFF and display of ON or OFF.

If the control unit 114 determines that motion blur notification is set to ON in step S603, the flow proceeds to step S604. In step S604, the control unit 114 detects a region based on a subject detected by the image processing unit 104 using the subject detection unit, a region based on a subject specified via the operation unit 115, or a main subject region based on a subject specified via the operation unit 115 and decides to estimate motion blur in the region and to provide a notification. Subsequently, the flow proceeds to step S605, and the control unit 114 generates a motion blur notification image obtained by the motion blur notification image generation unit 300 superimposing a motion blur notification plane on the preliminarily captured image in the region. In step S606, the control unit 114 displays the motion blur notification image on the display device of the display unit 113.

If the control unit 114 determines in step S603 that motion blur notification is set to OFF, the flow proceeds to step S606. In this case, the control unit 114 displays the preliminarily captured image on the display device of the display unit 113.

In step S607, the control unit 114 determines whether the shutter button of the operation unit 115 is depressed by a user operation. When the digital camera 100 is configured to accept an input method in two steps in which the shutter button is pressed halfway for giving an instruction for a preliminary shooting operation and is fully pressed for giving an instruction for actual shooting, the control unit 114 determines whether the shutter button is fully pressed. In one embodiment, when the digital camera 100 is configured to accept simple one-step input, the control unit 114 determines whether the one-step input is performed.

If the control unit 114 determines that the shutter button is not depressed, the flow returns to step S602, and the control unit 114 repeats the processes in step S602 to step S606. Accordingly, even during preliminary shooting, the user can easily confirm motion blur of the subject that may occur when actual shooting is performed with the currently set shooting parameter. When motion blur is confirmed and the motion blur is not motion blur of the user's preference (the user does not want motion blur to occur), the user is to reset the shutter speed (exposure time) for actual shooting without depressing the shutter button.

As described above, when a notification of motion blur of a subject is provided during preliminary shooting, the user can repeatedly set the exposure time for actual shooting while confirming a motion blur notification image displayed on the display unit 113 until motion blur of the user's preference is obtained. Thereafter, the user can have a shutter release opportunity with the exposure time having being set so as to correspond to appropriate motion blur.

If the control unit 114 determines in step S607 that the shutter button is depressed, the control unit 114 considers that an instruction for actual shooting is accepted, and the flow proceeds to step S608. In step S608, the control unit 114 controls the image forming optical unit 101, the imaging unit 102, and so on and performs actual shooting based on the shooting parameter set during the preliminary shooting. An actually captured image obtained in the actual shooting is output to the display unit 113 and the recording medium control unit 110 by the control unit 114 in step S609, is displayed on the display device of the display unit 113, and is recorded to the recording medium 111 or output to an external apparatus via, for example, a communication unit not illustrated from the recording medium control unit 110.

An example configuration of the motion blur notification image generation unit 300, which is included in the image processing unit 104 and which is a feature of the disclosure, will be described with reference to FIG. 7.

Figure 7:
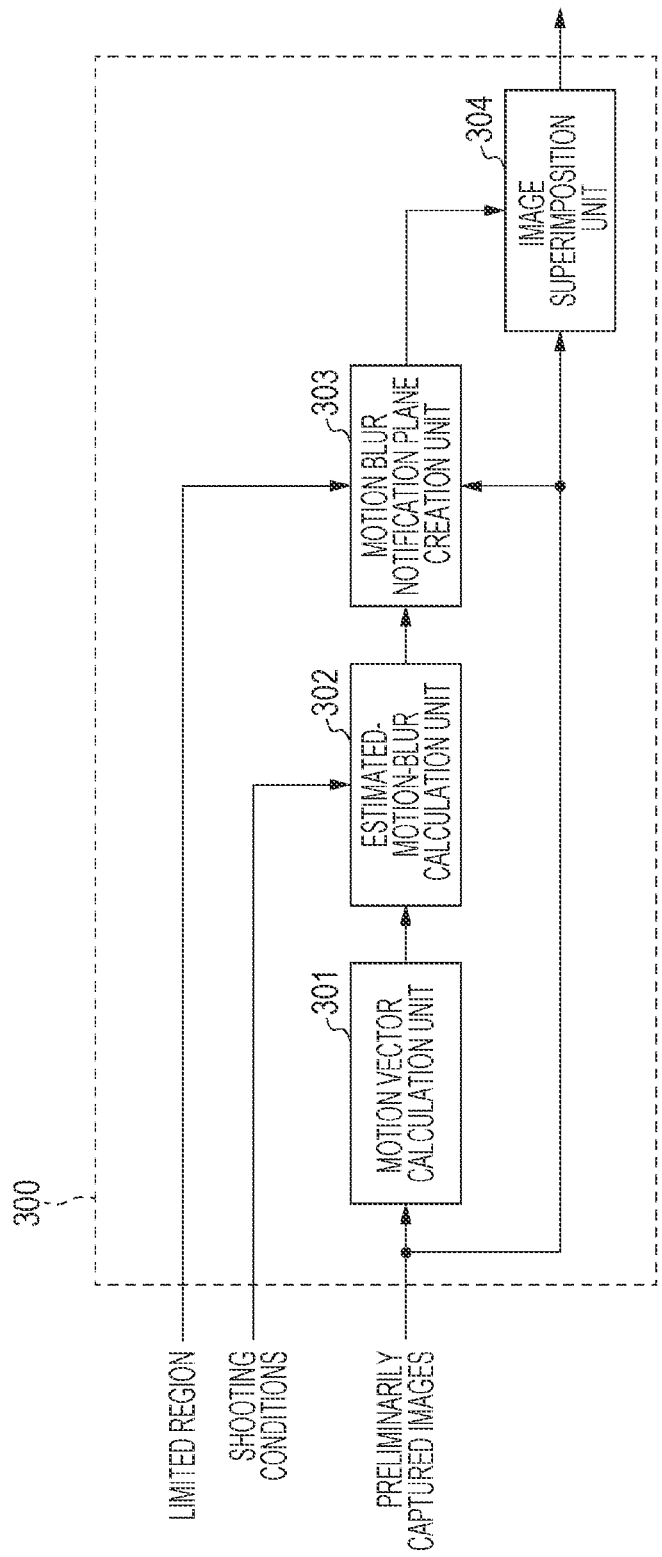
FIG. 7 is a diagram illustrating an example configuration of a motion blur notification image generation unit.

FIG. 7 is a diagram illustrating an example configuration of the motion blur notification image generation unit 300. The motion blur notification image generation unit 300 includes a motion vector calculation unit 301 that calculates motion vectors of a subject from a comparison between images and an estimated-motion-blur calculation unit 302 that estimates motion blur of the subject in actual shooting based on the calculated motion vectors. The motion blur notification image generation unit 300 further includes a motion blur notification plane creation unit 303 that creates data for providing a notification of motion blur based on the estimated motion blur of the subject and an image superimposition unit 304 that performs a superimposition process of superimposing the motion blur notification plane on a captured image.

Note that one or more of the functional blocks illustrated in FIG. 7 may be implemented as hardware such as an application-specific integrated circuit (ASIC) or a programmable logic array (PLA) or may be implemented by a programmable processor such as a CPU or a microprocessor unit (MPU) executing software. One or more of the functional blocks may be implemented as a combination of software and hardware. Therefore, even when different functional blocks are described as operating entities, the entities can be implemented as the same hardware.

Figure 8:
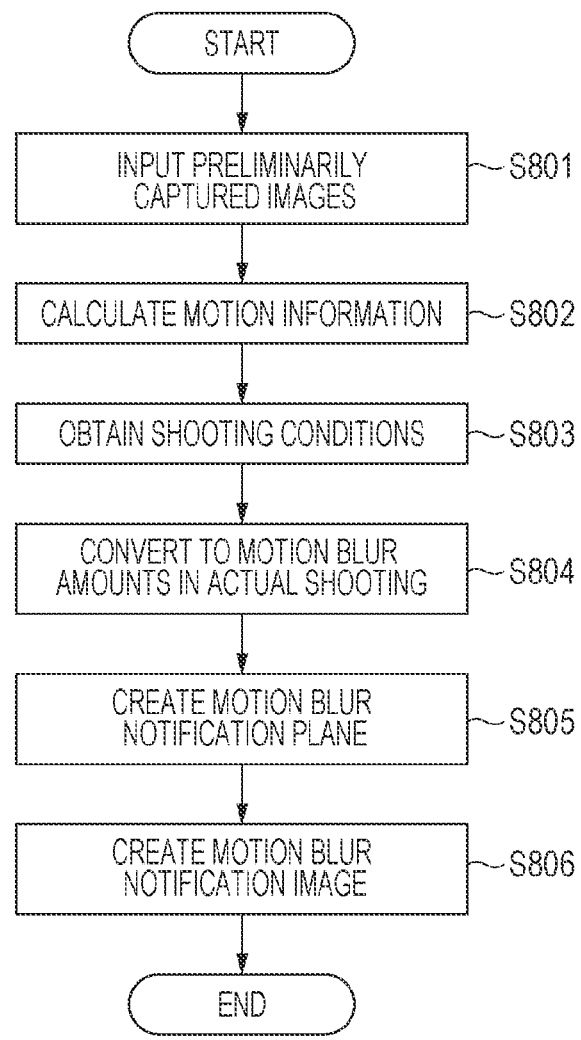
FIG. 8 is a diagram illustrating a process flow in the motion blur notification image generation unit.

Processes performed by the motion blur notification image generation unit 300 for generating a motion blur notification image will be described in detail with reference to the flowchart in FIG. 8. The steps in the flowchart are performed by the control unit 114 or by the units of the digital camera 100 including the motion blur notification image generation unit 300 in accordance with instructions from the control unit 114.

Figure 9A:
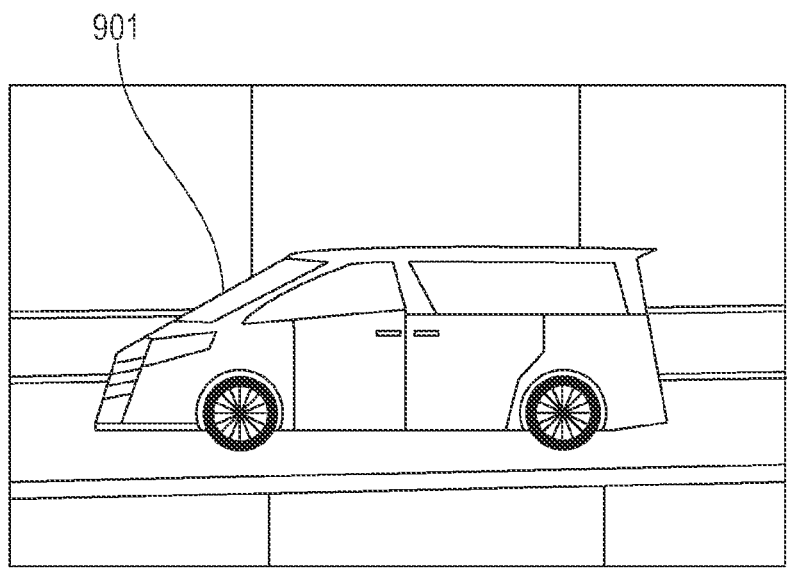
FIG. 9A is a diagram illustrating a preliminarily captured image.

In step S801, the control unit 114 inputs preliminarily captured images successively obtained by the imaging unit 102 and a shooting parameter used in actual shooting to the motion blur notification image generation unit 300. An example preliminarily captured image is illustrated in FIG. 9A. In this embodiment, a description will be given while using an example where, as illustrated in FIG. 9A, a car 901 traveling from right to left is being photographed.

In step S802, the motion vector calculation unit 301 of the motion blur notification image generation unit 300 calculates motion vectors between preliminarily captured images as motion information. A motion vector expresses the amount of movement of the subject in the horizontal direction and the amount of movement thereof in the vertical direction between preliminarily captured images as a vector. A method for calculating motion vectors will be described in detail with reference to FIG. 10 and FIG. 11.

FIG. 10 is a flowchart illustrating a motion vector calculation process by the motion vector calculation unit 301. Although a block matching method will be described as an example of a motion vector calculation method in the disclosure, the motion vector calculation method is not limited to this example and may be, for example, a gradient method. The steps in the flowchart are performed by the control unit 114 or by the units of the digital camera 100 including the motion blur notification image generation unit 300 in accordance with instructions from the control unit 114.

In step S1001, two preliminarily captured images captured at successive times are input to the motion vector calculation unit 301. The motion vector calculation unit 301 sets a preliminarily captured image in an M-th frame as a base frame and a preliminarily captured image in an M+1-th frame as a reference frame.

Figure 11:
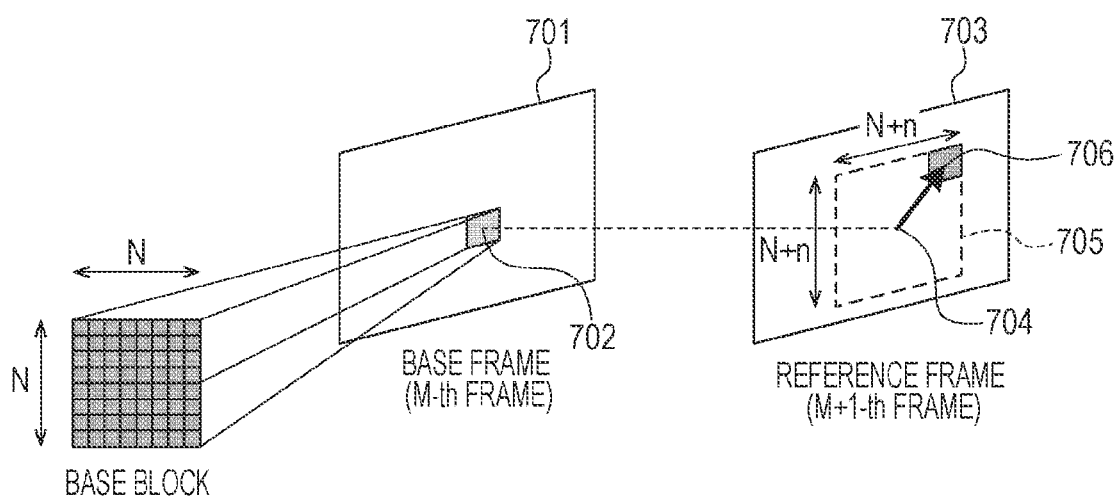
FIG. 11 is a diagram illustrating a motion vector calculation method.

In step S1002, the motion vector calculation unit 301 disposes a base block 702 constituted by N×N pixels in a base frame 701 as illustrated in FIG. 11.

In step S1003, the motion vector calculation unit 301 sets (N+n)×(N+n) pixels around a point 704 indicated by coordinates the same as the coordinates of the center of the base block 702 in the base frame 701 as a search area 705 in a reference frame 703, as illustrated in FIG. 11.

In step S1004, the motion vector calculation unit 301 calculates the correlations between the base block 702 in the base frame 701 and reference blocks 706 each constituted by N×N pixels, indicated by different sets of coordinates, and present within the search area 705 in the reference frame 703 and calculates correlation values. Each of the correlation values is calculated based on the sum of the absolute values of inter-frame differences each of which is the difference between corresponding pixels in the base block 702 and a corresponding one of the reference blocks 706. That is, coordinates for which the sum of the absolute values of inter-frame differences is smallest are coordinates having the highest correlation value. Correlation values need not be calculated with the method of calculating the sum of the absolute values of inter-frame differences, and a method of calculating correlation values, for example, based on the sum of the squares of inter-frame differences or based on normal cross-correlation values may be used. FIG. 11 illustrates an example where the reference block 706 that is shaded in FIG. 11 has the highest correlation.

In step S1005, the motion vector calculation unit 301 calculates a motion vector based on the coordinates of the reference block having the highest correlation value, which are calculated in step S1004. In the example illustrated in FIG. 11, in the search area 705 in the reference frame 703, the motion vector is calculated based on the coordinates of the point 704 corresponding to the coordinates of the center of the base block 702 in the base frame 701 and the coordinates of the center of the reference block 706. That is, the distance and direction from the point 704 to the center of the reference block 706 are calculated as a motion vector based on the coordinates.

Figure 9B:
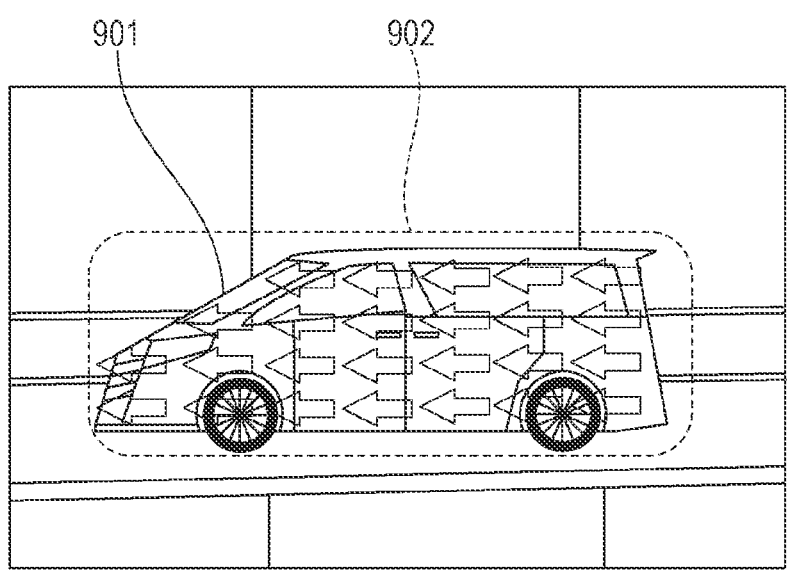
FIG. 9B is a diagram illustrating motion vectors.

In step S1006, the motion vector calculation unit 301 determines whether motion vectors are calculated for all pixels in the base frame 701. If the motion vector calculation unit 301 determines in step S1006 that motion vectors for all pixels are not calculated, the flow returns to step S1002. In response to the return to step S1002, the base block 702 that is centered around a pixel for which a motion vector is not calculated and that is constituted by N×N pixels is disposed in the base frame 701, and the processes in step S1003 to step S1005 are performed as described above. That is, the motion vector calculation unit 301 repeats the processes in step S1002 to step S1005 while moving the base block 702 illustrated in FIG. 11 and calculates motion vectors for all pixels in the base frame 701. Example motion vectors are illustrated in FIG. 9B. FIG. 9B is a diagram illustrating example motion vectors for the preliminarily captured image illustrated in FIG. 9A. FIG. 9B also illustrates a main subject region 902 that is detected in subject region detection by the image processing unit 104.

In the preliminarily captured image illustrated in FIG. 9A, for example, the car 901 traveling leftward is present. Typical examples of motion vectors when the subject is moving as described above are illustrated in FIG. 9B. In the example in FIG. 9B, the car 901 that is traveling is detected as motion vectors directed leftward, and the fence, other than the car 901, that remains stationary in the background is detected as a motion vector of zero, and therefore, no motion vector is illustrated.

The motion vector calculation unit 301 may calculate a motion vector for each of the predetermined pixels, for example, around a subject region instead of calculating motion vector for all pixels.

With the processes described above, the motion vector calculation unit 301 calculates motion vectors between preliminarily captured images captured at successive times.

The processes performed by the motion vector calculation unit 301 for calculating motion vectors has been described above.

Subsequently, in step S803, the estimated-motion-blur calculation unit 302 obtains as shooting conditions, the exposure time for actual shooting set in step S602 and the time interval between images in preliminary shooting, and the flow proceeds to step S804.

Figure 12:
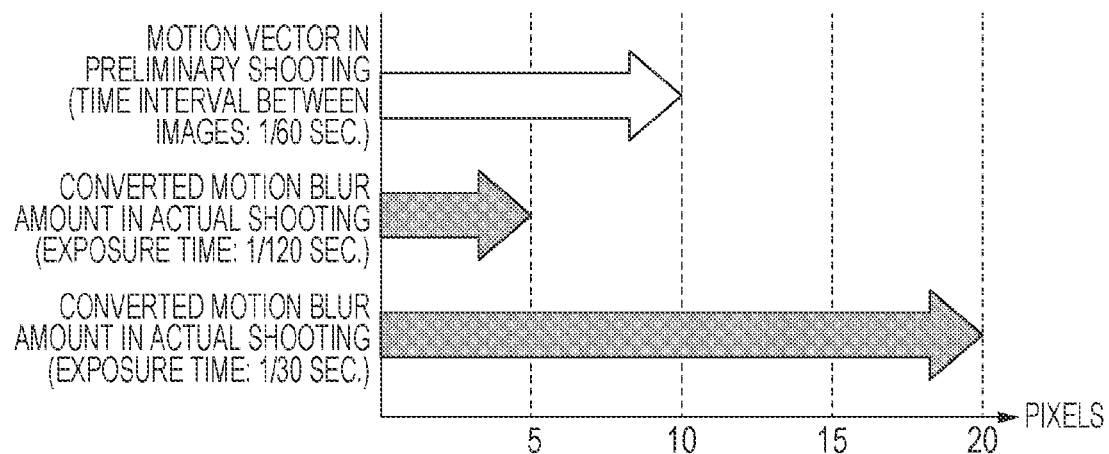
FIG. 12 is a diagram illustrating a motion vector and estimated motion blur amounts.

In step S804, the estimated-motion-blur calculation unit 302 estimates a motion blur amount in actual shooting from the motion vector for each pixel calculated in step S802, based on the exposure time for actual shooting and the time interval between images in preliminary shooting obtained in step S803. A method for estimating the motion blur amount in actual shooting will be described in detail with reference to FIG. 12. FIG. 12 is a diagram illustrating a motion vector in preliminary shooting and estimated motion blur amounts that are estimated as motion blur in actual shooting. FIG. 12 illustrates an example where the time interval between images in preliminary shooting is 1/60 seconds, and the exposure time for actual shooting is set to 1/120 seconds and 1/30 seconds as shooting conditions.

The estimated-motion-blur calculation unit 302 estimates the motion blur amount in actual shooting from a motion vector for each pixel, based on expression (1) and expression (2) that are expressions for estimation.

CONV_GAIN=EXP_TIME/INT_TIME     expression (1)

CONV_BLUR=VEC_LEN×CONV_GAIN     expression (2)

Here, in expression (1), CONV_GAIN is an estimation gain for estimating the motion blur amount in actual shooting from a motion vector in preliminary shooting, EXP_TIME is the exposure time for actual shooting, and INT_TIME is the time interval between images in preliminary shooting. In expression (2), CONV_BLUR is the estimated motion blur amount in actual shooting, and VEC_LEN is the length of the motion vector in preliminary shooting.

In expression (1), the estimation gain is calculated by dividing the exposure time for actual shooting by the time interval between images in preliminary shooting. In expression (2), the estimated motion blur amount in actual shooting is calculating by multiplying the length of the motion vector by the estimation gain.

Specifically, when the length of a motion vector in preliminary shooting is 10 pixels as illustrated in FIG. 12, the estimated motion blur amount when the exposure time for actual shooting is 1/120 seconds is 5 pixels because the estimation gain is ½ times. The estimated motion blur amount when the exposure time for actual shooting is 1/30 seconds is 20 pixels because the estimation gain is two times.

In step S805, the motion blur notification plane creation unit 303 creates an image plane for providing a notification of motion blur, based on the estimated motion blur amount for each pixel calculated in step S804. The image plane is created for a region that is determined based on a specified region that is the main subject region obtained in step S604. That is, the image processing unit 104 in step S604 functions as a specifying unit that specifies the main subject region as a notification region.

In step S806, the image superimposition unit 304 superimposes the motion blur notification plane created in step S805 on the preliminarily captured image and generates a motion blur notification image.

Figure 13A:
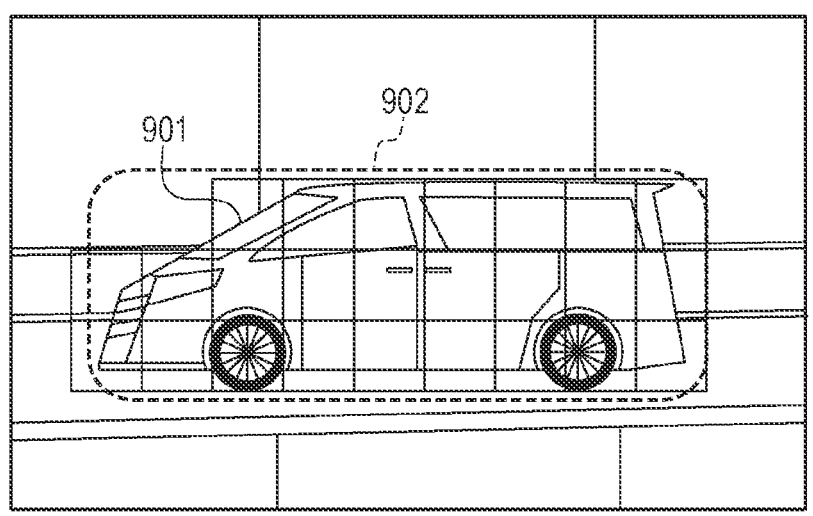
FIGS. 13A and 13B are diagrams illustrating motion blur notification methods according to the first embodiment of the disclosure.
Figure 13B:
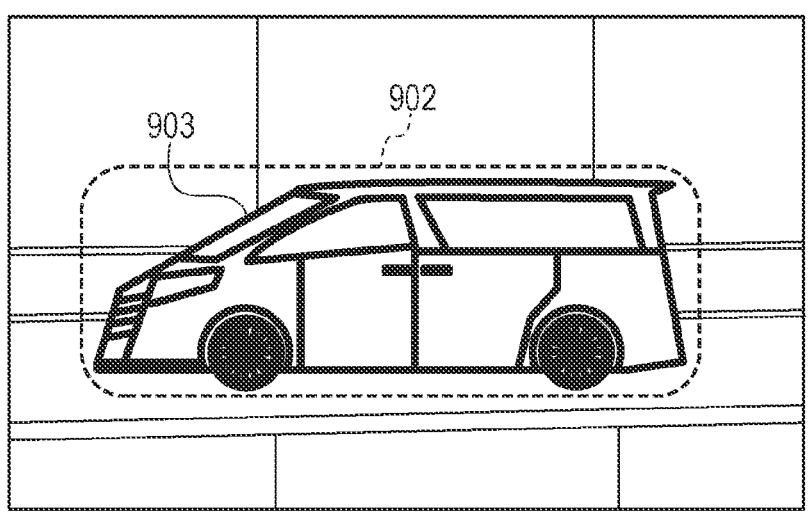

A method for generating a motion blur notification image will be described in detail with reference to FIGS. 13A and 13B. FIGS. 13A and 13B illustrate two example motion blur notification images. When a motion blur notification image is displayed on the display unit 113 during preliminary shooting, the user can easily confirm motion blur.

FIG. 13A illustrates an example where a notification of motion blur is provided by displaying a motion blur frame. A method for generating a motion blur notification image with display of a motion blur frame will be described. In step S805, the motion blur notification plane creation unit 303 calculates the ratio of pixels, in each divided region of the divided regions in the specified region, each having an estimated motion blur amount greater than or equal to a predetermined value, relative to all of the pixels in the divided region. For each divided region having a ratio greater than a predetermined ratio, the motion blur notification plane creation unit 303 creates a motion blur frame as illustrated in FIG. 13A as a motion blur notification plane and superimposes the motion blur frame on the preliminarily captured image to thereby generate a motion blur notification image for the main subject region 902 as illustrated in FIG. 13A.

FIG. 13B illustrates an example where an edge on which motion blur occurs is highlighted to thereby provide a notification of motion blur. A method for generating a motion blur notification image with highlighting of a motion blur edge will be described. In step S805, the motion blur notification plane creation unit 303 detects the edge strength of the preliminarily captured image in the specified region. The edge strength is calculated with an existing method such as the Sobel filter, and therefore, a description of the method is omitted. The motion blur notification plane creation unit 303 extracts pixels each having an edge strength greater than or equal to a predetermined value and each having an estimated motion blur amount greater than or equal to a predetermined value. For the extracted pixels, the motion blur notification plane creation unit 303 creates a motion blur edge 903 that is highlighted as illustrated in FIG. 13B as a motion blur notification plane and superimposes the motion blur edge 903 on the preliminarily captured image to thereby generate a motion blur notification image as illustrated in FIG. 13B. In the example illustrated in FIG. 13B, the motion blur edge 903 in the main subject region 902 is made thick. In another example of the highlighting method, pixels each having an edge strength greater than or equal to the predetermined value and each having an estimated motion blur amount greater than or equal to the predetermined value are extracted, and the extracted pixels are colored red.

The processes performed by the motion blur notification image generation unit 300 for generating a motion blur notification image has been described above. The processes may be referred to as "notification process" herein.

According to the this embodiment, a motion blur notification is provided for the main subject region, that is, a notification of motion blur in the background that is expected to occur when, for example, the camera pans from side to side is not provided, and only motion blur in the main subject region is indicated to thereby make confirmation of motion blur easier.

Second Embodiment

Figure 14:
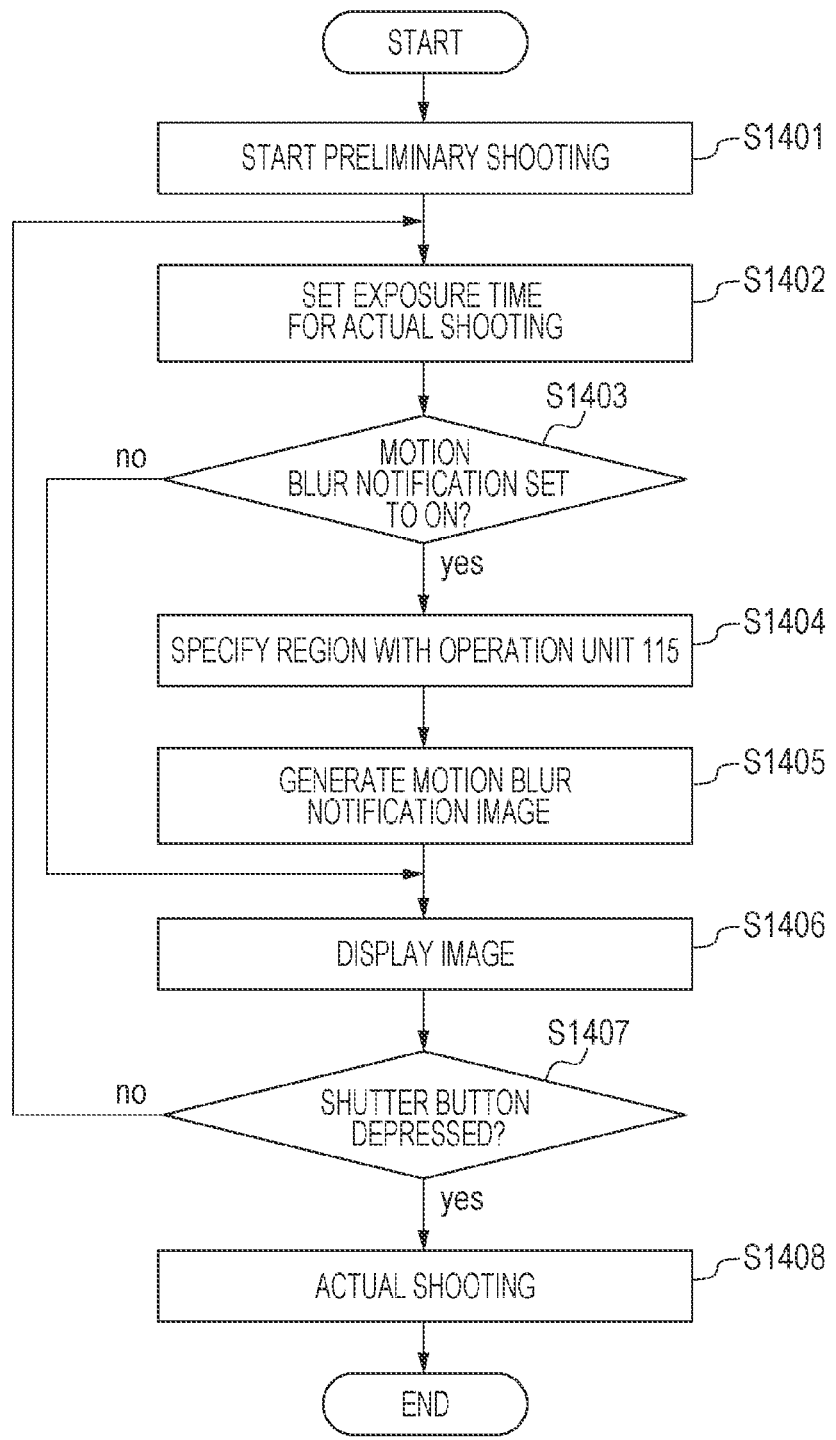
FIG. 14 is a diagram illustrating an image capturing process flow according to a second embodiment of the disclosure.

Processes in the digital camera 100 according to a second embodiment will be described in detail with reference to the flowchart in FIG. 14. The processes in steps S1401 to S1408 except for step S1404 are the same as those in steps S601 to S608 in FIG. 6, and therefore, descriptions thereof are omitted. The steps in the flowchart are performed by the control unit 114 or by the units of the digital camera 100 in accordance with instructions from the control unit 114.

Figure 15:
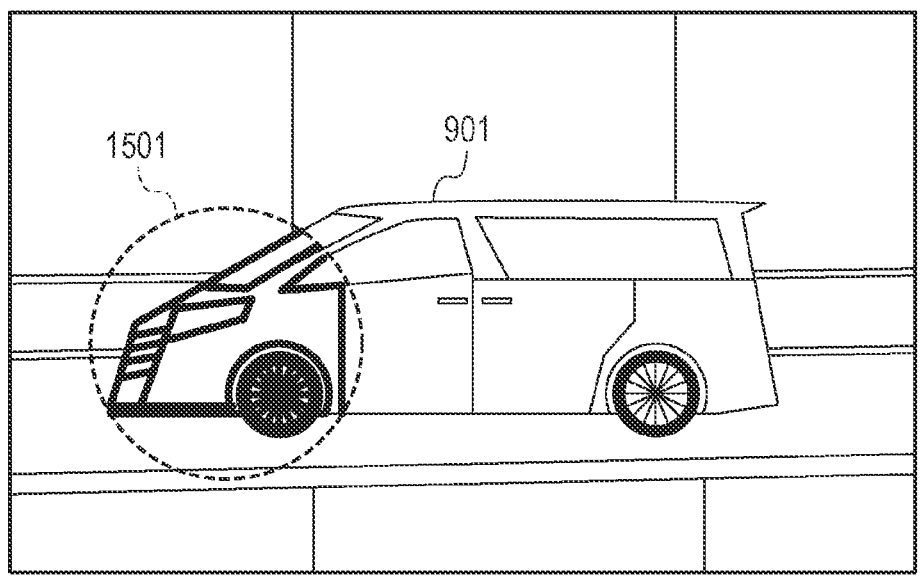
FIG. 15 is a diagram illustrating a motion blur notification method 1 according to the second embodiment of the disclosure.

FIG. 15 is a diagram illustrating a motion blur notification method 1 according to the second embodiment of the disclosure and illustrates a preliminarily captured image in which a motion blur notification is provided in a specified region. In step S1404, the user specifies a region with a touch operation on the captured image displayed on the touch-panel liquid crystal display of the operation unit 115. A region 1501 selected here is assumed to be the specified region, the motion blur notification plane creation unit 303 illustrated in FIG. 7 performs processes, and a motion blur notification with highlighting of a motion blur edge is provided for the region 1501 in step S1405. A notification can be provided for the region that is within a predetermined range from a position specified by the user. A motion blur notification can be provided for a specific region that is within a predetermined range from the specified position.

Figure 16A:
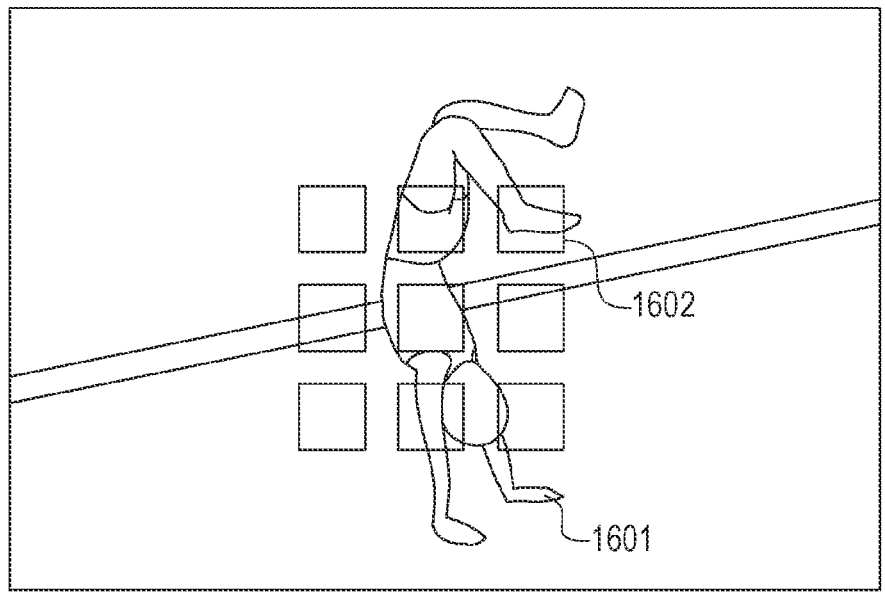
FIGS. 16A and 16B are diagrams illustrating a motion blur notification method 2 according to the second embodiment of the disclosure.
Figure 16B:
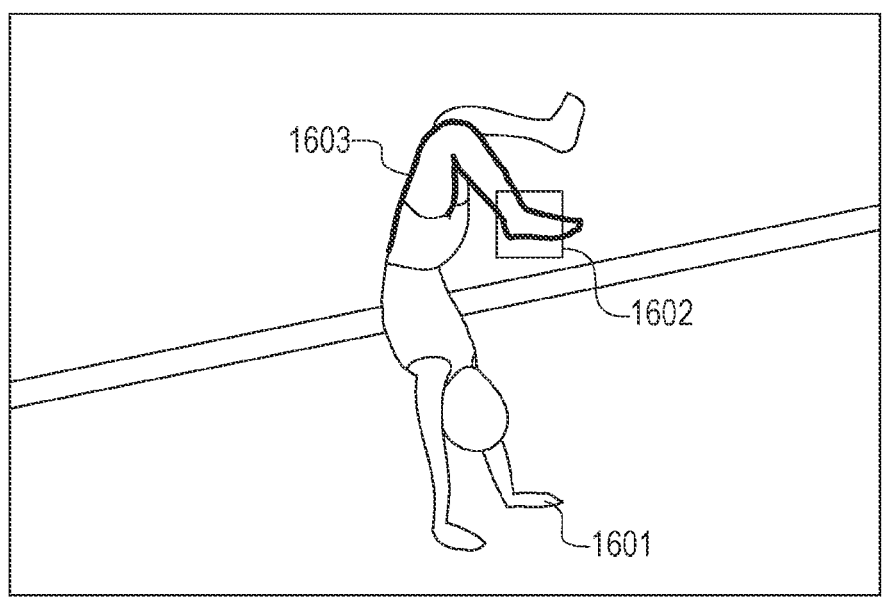

Although the user specifies the region 1501 on the touch-panel liquid crystal display, which is an example of the operation unit 115, in the description given above, the user can specify a region by setting an AF frame by operating the cross key of the operation unit 115. FIGS. 16A and 16B are diagrams illustrating a motion blur notification method 2 according to the second embodiment of the disclosure. FIG. 16A illustrates a preliminarily captured image on which nine AF frames are displayed so as to overlap a subject 1601.

First, the user sets a top right frame 1602 among the AF frames by operating the operation unit 115. In a state in which the AF frame 1602 overlaps the right foot of the subject 1601, the image processing unit 104 performs meaning-based region division. As illustrated in FIG. 16B, a part 1603 corresponding to the right leg of the subject 1601 is assumed to be a specified region, and the motion blur notification plane creation unit 303 performs processes. As a result, in step S1405, a motion blur notification with highlighting of a motion blur edge is provided for the part 1603 corresponding to the right leg of the subject 1601 as illustrated in FIG. 16B.

According to the this embodiment, the user sets a motion blur notification region in a limited manner by operating the operation unit 115, and a notification of motion blur in the background that is expected to occur when, for example, the camera pans from side to side is not provided. Motion blur in a specified region is indicated to thereby make confirmation of motion blur easier.

Third Embodiment

Processes in the digital camera according to a third embodiment will be described in detail with reference to the flowchart in FIG. 17. The processes in steps S1701 to S1708 except for step S1704 are the same as those in steps S601 to S608 in FIG. 6, and therefore, descriptions thereof are omitted. The steps in the flowchart are performed by the control unit 114 or by the units of the digital camera 100 in accordance with instructions from the control unit 114.

Figure 18:
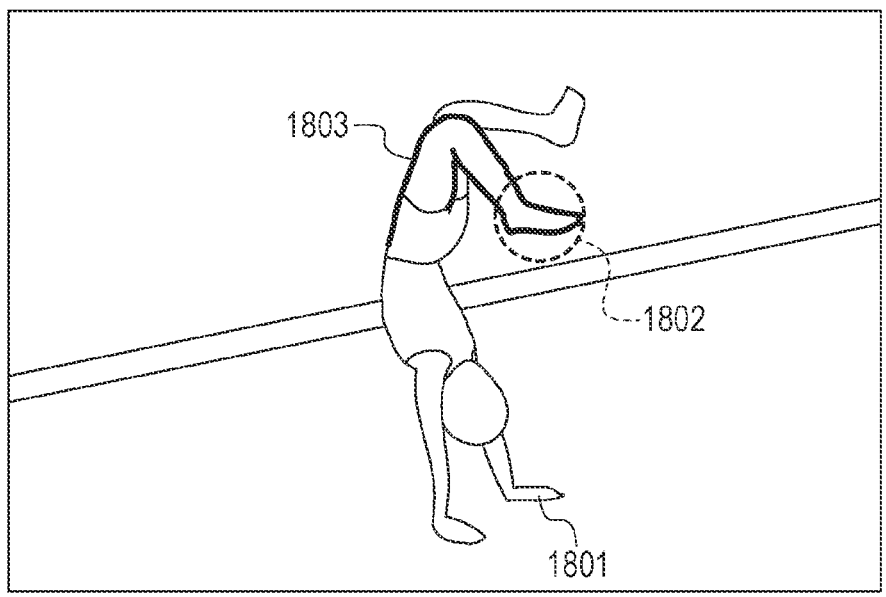
FIG. 18 is a diagram illustrating a motion blur notification method according to the third embodiment of the disclosure.

FIG. 18 is a diagram illustrating a motion blur notification method according to the third embodiment of the disclosure. In step S1704, The line-of-sight detection circuit 118 detects a gaze region 1802 at which the user is gazing, in accordance with the schematic flow of the line-of-sight detection routine in FIG. 5 described above. As in the second embodiment, in a state in which the gaze region 1802 overlaps the right foot of a subject 1801, the image processing unit 104 performs meaning-based region division, a part 1803 corresponding to the right leg of the subject 1801 is assumed to be a specified region, and the motion blur notification plane creation unit 303 illustrated in FIG. 7 performs processes. In step S1705 in FIG. 17, a motion blur notification with highlighting of a motion blur edge is provided for the part 1803 corresponding to the right leg of the subject 1801.

According to this embodiment, a motion blur notification region is set in a limited manner for a gaze region detected by the line-of-sight detection unit, and a notification of motion blur in the background that is expected to occur when, for example, the camera pans from side to side is not provided. Motion blur in the gaze region detected by the line-of-sight detection unit is indicated to thereby make confirmation of motion blur easier.

Fourth Embodiment

Processes in the digital camera 100 according to a fourth embodiment will be described. In this embodiment, processes similar to those in the flowchart in FIG. 17 described above in the third embodiment are performed in the digital camera 100.

Figure 19:
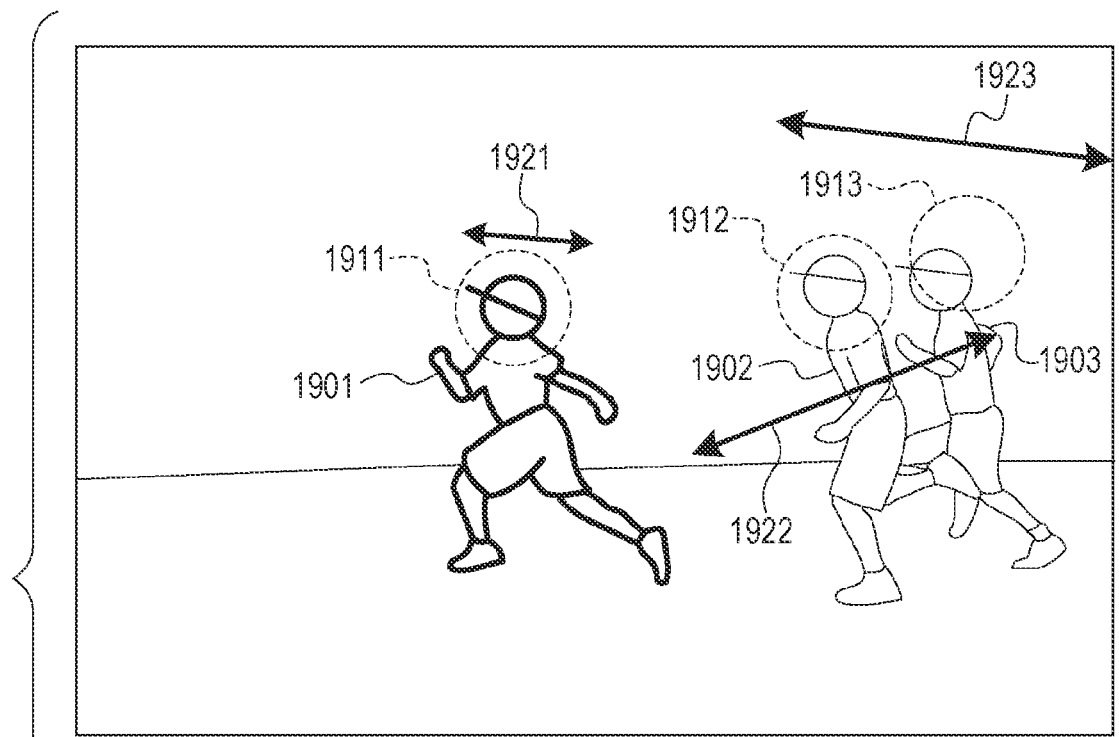
FIG. 19 is a diagram illustrating an operation of changing the visibility of a motion blur notification region in accordance with the movement range of a gaze region according to a fourth embodiment of the disclosure.

FIG. 19 is a diagram illustrating an operation of changing the visibility of a motion blur notification region in accordance with the movement range of a gaze region. The details of the processes will be described below with reference to FIG. 19. When the user is directing their line of sight to each of the subjects, the line-of-sight detection circuit 118 detects an amount by which the gaze region moves. Accordingly, the line-of-sight detection circuit 118 can calculate the movement range of the line of sight. Here, the number of pixels for determination that serves as a base for the amount of movement of the line of sight is set. The number of pixels for determination is a value used to determine whether a subject included in a gaze region is a main subject, based on the number of pixels by which the line of sight moves, and is variable in accordance with the shooting scene and the image resolution. When the movement range of the line of sight directed to a subject is less than the number of pixels for determination, the motion blur notification plane creation unit 303 illustrated in FIG. 7 assumes the subject to be a main subject and makes the motion blur notification region be displayed with a high visibility. On the other hand, when the movement range of the line of sight directed to a subject is greater than the number of pixels for determination, the motion blur notification plane creation unit 303 determines that the subject is not a main subject and makes the motion blur notification region be displayed with a low visibility.

As a method for increasing or decreasing the visibility of the motion blur notification region, when an image region in which the motion blur notification region is displayed is white, the motion blur edge is displayed in a color, for example, red, yellow, orange, blue, pink, light green, light violet, green, or violet in descending order of visibility. When an image region in which the motion blur notification region is displayed is black, the motion blur edge is displayed in a color, for example, yellow, orange, red, light green, pink, blue, green, light violet, or violet in descending order of visibility. The order of high-visibility colors is not limited to the above-described examples, and colors used and the number of colors are not specifically limited.

Although the motion blur edge is colored to increase or decrease the visibility of the motion blur notification region, another method may be used. For example, in FIG. 19, the amount of movement 1921 of a gaze region 1911 corresponding to a subject 1901 is 250 pixels, the amount of movement 1922 of a gaze region 1912 corresponding to a subject 1902 is 1500 pixels, and the amount of movement 1923 of a gaze region 1913 corresponding to a subject 1903 is 1800 pixels. When the number of pixels for determination is 500 pixels, the motion blur notification plane creation unit 303 illustrated in FIG. 7 displays a motion blur edge for the subject 1901 captured in the gaze region 1911 while changing the thickness of the motion blur edge.

According to this embodiment, when the movement (swaying) range of the line of sight directed to a subject is less than the number of pixels for determination, the subject is assumed to be a main subject and the visibility of the motion blur notification region is increased to thereby make confirmation of motion blur of the subject easier.

Fifth Embodiment

Processes in the digital camera 100 according to a fifth embodiment will be described. In this embodiment, processes similar to those in the flowchart in FIG. 17 described in the third embodiment are performed in the digital camera 100.

Figure 20:
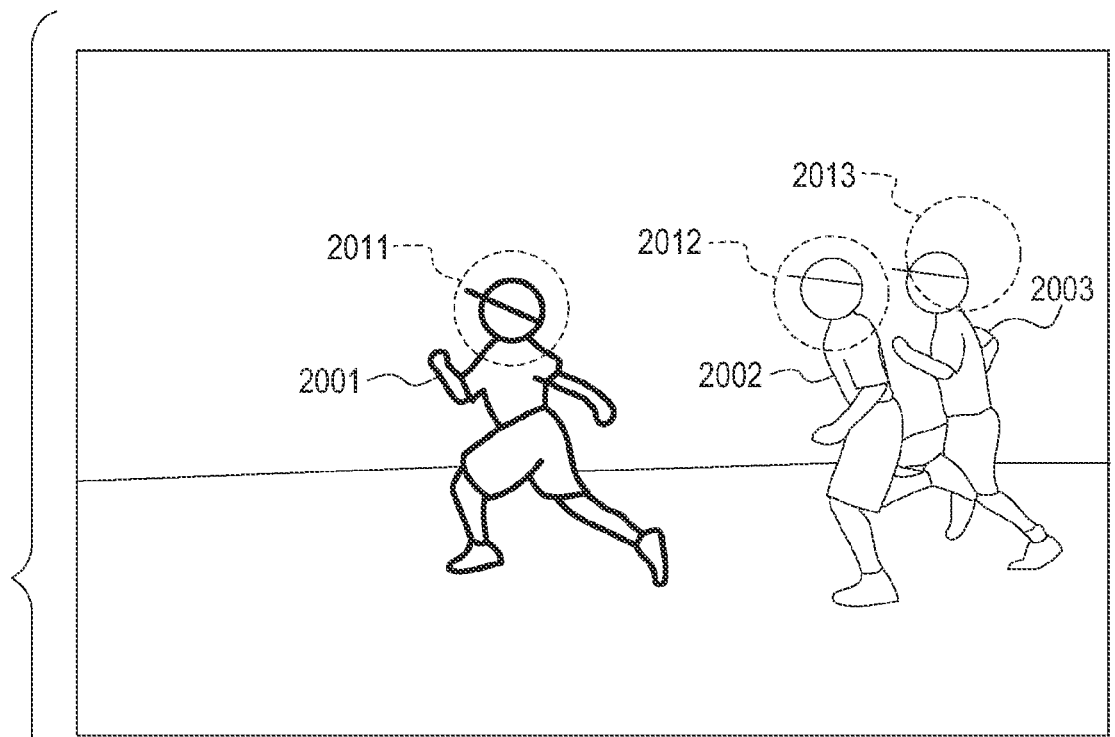
FIG. 20 is a diagram illustrating an operation of changing the visibility of a motion blur notification region in accordance with the gaze duration for a gaze region according to a fifth embodiment of the disclosure.

FIG. 20 is a diagram illustrating an operation of changing the visibility of a motion blur notification region in accordance with the gaze duration for a gaze region. The details of the processes will be described below with reference to FIG. 20. When the user is directing their line of sight to each of the subjects, the line-of-sight detection circuit 118 detects the length of the gaze duration. Here, a gaze duration for determination that serves as a base for the length of a gaze duration is set. The gaze duration for determination is a time length used to determine whether a subject at which the user is gazing is a main subject, and is variable in accordance with the shooting scene and the shooting conditions. When the gaze duration in which the line of sight is directed to a subject is longer than the gaze duration for determination, the motion blur notification plane creation unit 303 illustrated in FIG. 7 assumes the subject to be a main subject and makes the motion blur notification region be displayed with a high visibility. On the other hand, when the gaze duration in which the line of sight is directed to a subject is shorter than the gaze duration for determination, the motion blur notification plane creation unit 303 determines that the subject is not a main subject and makes the motion blur notification region be displayed with a low visibility. The visibility of the motion blur notification region is increased or decreased with the method described in the fourth embodiment, and therefore, a description of the method is omitted here.

In FIG. 20, the gaze duration for a gaze region 2011 corresponding to a subject 2001 is 6400 ms, the gaze duration for a gaze region 2012 corresponding to a subject 2002 is 500 ms, and the gaze duration for a gaze region 2013 corresponding to a subject 2003 is 3300 ms. The motion blur notification plane creation unit 303 illustrated in FIG. 7 displays a motion blur edge for the subject 2001 captured in the gaze region 2011 for which the gaze duration is long while changing the thickness of the motion blur edge.

According to this embodiment, when the gaze duration in which the line of sight is directed to a subject is long, the subject is assumed to be a main subject and the visibility of the motion blur notification region is increased to thereby make confirmation of motion blur of the main subject easier.

Sixth Embodiment

Processes in the digital camera 100 according to a sixth embodiment will be described. In this embodiment, processes similar to those in the flowchart in FIG. 17 described in the third embodiment are performed in the digital camera 100.

Figure 21:
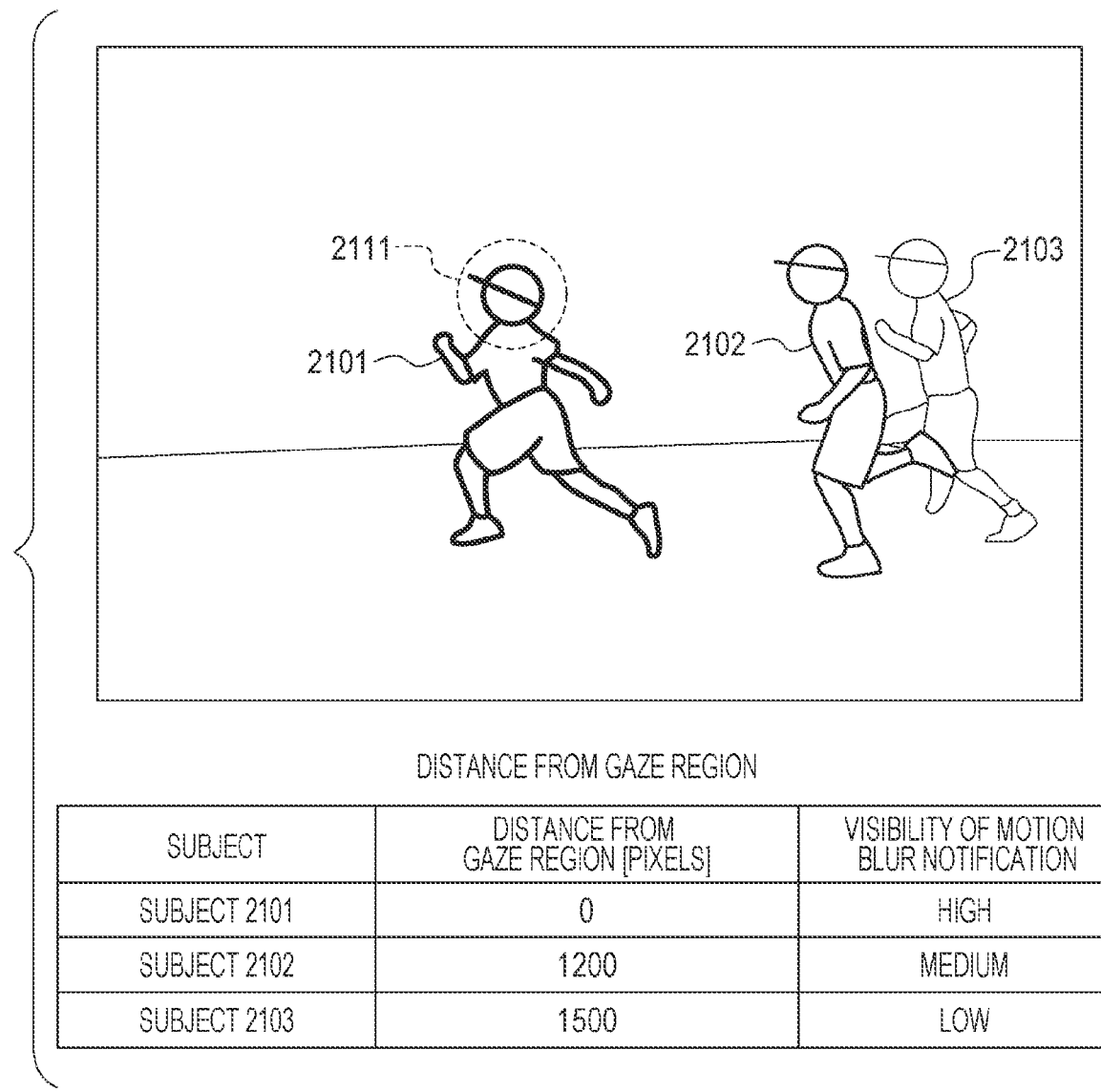
FIG. 21 is a diagram illustrating an operation of changing the visibility of a motion blur notification region in accordance with the distance from a gaze region according to a sixth embodiment of the disclosure.

FIG. 21 is a diagram illustrating an operation of changing the visibility of a motion blur notification region in accordance with the distance from a gaze region. The details of the processes will be described below with reference to FIG. 21. The line-of-sight detection circuit 118 detects the distances between a gaze region in which the line of sight is directed to a main subject and other subjects. The motion blur notification plane creation unit 303 illustrated in FIG. 7 changes the visibilities of the motion blur notification regions of the other subjects in accordance with the distances between the other subjects and the gaze region in which the line of sight is directed to the main subject. As the distance to another subject is shorter, the motion blur notification plane creation unit 303 makes the motion blur notification region of the other subject be displayed with a higher visibility, and as the distance to another subject is longer, the motion blur notification plane creation unit 303 makes the motion blur notification region of the other subject be displayed with a lower visibility. The visibility of the motion blur notification region is increased or decreased with the method described in the fourth embodiment, and therefore, a description of the method is omitted here.

In FIG. 21, the distance from the gaze region to a subject 2101 is 0 pixels, the distance from the gaze region to a subject 2102 is 1200 pixels, and the distance from the gaze region to a subject 2103 is 1500 pixels. The motion blur notification plane creation unit 303 illustrated in FIG. 7 displays motion blur edges for the subjects such that the thickness of the motion blur edge for a subject at a shorter distance of a gaze region 2111 is increased.

According to this embodiment, when the distance from the gaze region to a subject is short, the subject is assumed to be a main subject and the visibility of the motion blur notification region is increased to thereby make confirmation of motion blur of the main subject easier.

Seventh Embodiment

Processes in the digital camera 100 according to a seventh embodiment will be described. In this embodiment, processes similar to those in the flowchart in FIG. 17 described in the third embodiment are performed in the digital camera 100.

Figure 22:
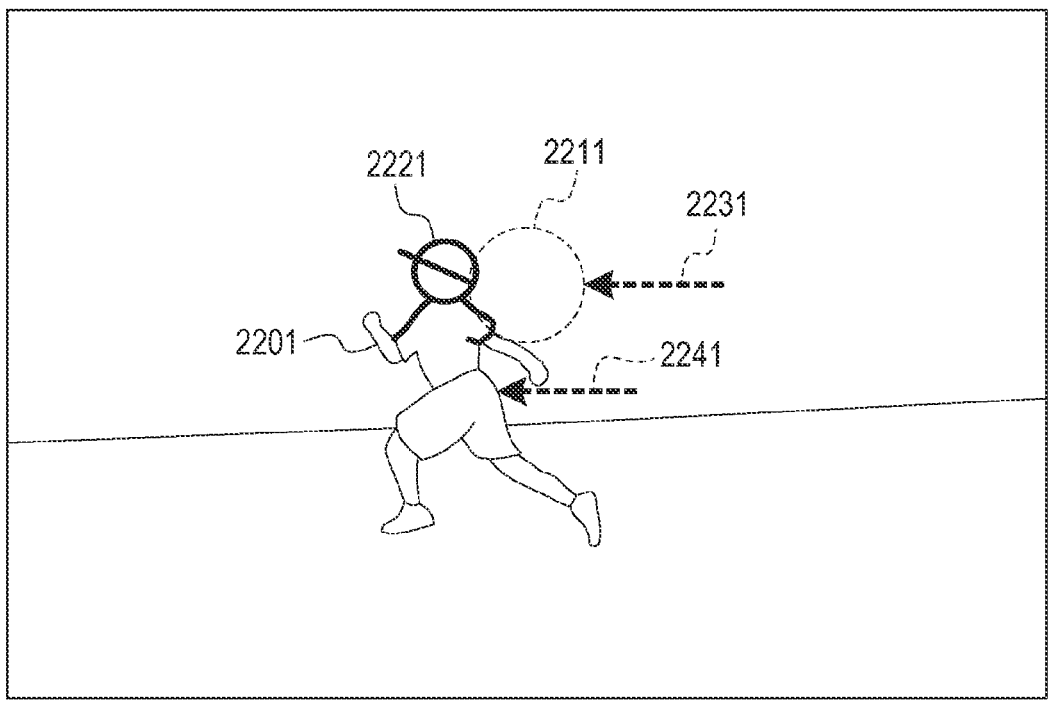
FIG. 22 is a diagram illustrating a method for displaying a motion blur notification region corresponding to a gaze region according to a seventh embodiment of the disclosure.

FIG. 22 is a diagram illustrating a method for displaying a motion blur notification region corresponding to a gaze region. A subject 2201 is moving in a left direction 2241 (represented by an arrow) in FIG. 22. A gaze region 2211 is similarly moving in a left direction 2231 (represented by an arrow) in FIG. 22 while following the subject 2201. In general, the movement of an eyeball for tracking a moving subject lags behind the subject, and therefore, the gaze region 2211 is expected to be at a position away from the subject 2201. That is, a display region in which the gaze region is displayed is apart from the subject. To cancel out the difference due to the lag of the eyeball movement, the motion blur notification plane creation unit 303 illustrated in FIG. 7 displays a motion blur edge 2221 for the subject 2201 that is ahead in the movement direction of the gaze region.

According to this embodiment, a lag of the movement of an eyeball for tracking a subject is canceled out to thereby make the motion blur notification region be displayed for the subject appropriately. A lag of the movement for tracking differs among individuals, and therefore, a process may be performed in which calibration or the like is performed in advance, a lag in the movement for tracking is measured, and the display position of the motion blur notification region for a subject that the gaze region is following is adjusted. A process may be performed in which a gaze region is displayed so as to follow a subject that the gaze region is following, in accordance with the speed of the subject.

Other Embodiments

Although embodiments of the disclosure have been described above, the disclosure is not limited to these embodiments, and various forms made without departing from the gist of the disclosure are included in the disclosure.

The disclosure can be implemented as follows. A storage medium to which a program code of software that describes a procedure for implementing the functions of the above-described embodiments is recorded is supplied to a system or an apparatus. A computer (or a control unit, an MPU, or the like) of the system or the apparatus reads the program code stored in the storage medium and executes the program code.

In this case, the program code read from the storage medium implements the new functions of the disclosure, and the storage medium that stores the program code and the program code constitute the disclosure.

Examples of the storage medium for supplying the program code include a flexible disk, a hard disk, an optical disk, and a magneto-optical disk. A compact disc read-only memory (CD-ROM), a compact disc recordable (CD-R), a compact disc rewritable (CD-RW), a digital versatile disc read-only memory (DVD-ROM), a digital versatile disc random access memory (DVD-RAM), a digital versatile disc rewritable (DVD-RW), a digital versatile disc recordable (DVD-R), a magnetic tape, a nonvolatile memory card, a ROM, and so on can be used.

When the program code read by the computer is made executable, the functions of the above-described embodiments are implemented. The disclosure also includes a case where an operating system (OS) or the like running on the computer performs some or all of the actual processes in accordance with an instruction of the program code and the functions of the above-described embodiments are implemented by the processes.

The disclosure further includes the following case. First, the program code read from the storage medium is written to a memory included in a function extension board inserted into a computer or a function extension unit connected to a computer. Thereafter, a control unit or the like included in the function extension board or the function extension unit performs some or all of the actual processes in accordance with an instruction of the program code.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-091155 filed Jun. 3, 2022, which is hereby incorporated by reference herein in its entirety.

What is claimed is:

1. An apparatus comprising:
one or more processors; and
a memory storing instructions which, when executed by the one or more processors, cause the one or more processors to function as:
an obtaining unit configured to obtain a plurality of first captured images obtained by performing first shooting with a first parameter and motion information about subjects in the plurality of first captured images;
an estimation unit configured to, when second shooting is performed with a second parameter set independent of the first parameter, estimate motion blur of the subjects in a second captured image obtained in the second shooting, from the motion information and the second parameter;
a notification unit configured to perform a notification process corresponding to information about the motion blur;
a specifying unit configured to specify a subject, among the subjects, for which the notification process is performed; and
a determination unit configured to determine a region for which the notification process is performed, based on the specified subject, wherein
the notification unit is configured to perform the notification process for the determined region,
the specifying unit is a gaze region detection unit configured to detect a gaze region,
the notification unit is configured to change a visibility in the notification process in accordance with at least one of a range over which the detected gaze region moves, a gaze duration, or a distance from the gaze region.

2. The apparatus according to claim 1, wherein
the determination unit includes a subject detection unit, and
the notification unit is configured to perform the notification process for a detected subject region as a region for which a notification is provided.

3. The apparatus according to claim 1, wherein
the specifying unit is a touch panel, and
the notification unit is configured to perform the notification process for a region determined by the determination unit based on a subject specified by a user operation on the touch panel.

4. The apparatus according to claim 1, wherein
the specifying unit is an operation member used to specify a position of an autofocus frame, and
the notification unit is configured to perform the notification process for a region determined by the determination unit based on a position of an autofocus frame specified by an operation of the operation member.

5. The apparatus according to claim 1, wherein
the estimation unit is configured to estimate motion blur for a specific region of the specified subject, the specific region being detected by the determination unit based on the specified subject, and
the notification unit is configured to perform the notification process for the specific region based on the motion blur estimated by the estimation unit.

6. The apparatus according to claim 5, wherein
the specific region includes at least one of parts of a person, an animal, or a vehicle.

7. The apparatus according to claim 5, wherein
the specifying unit is configured to specify the subject by specifying a position in one of the first captured images, and
the determination unit is configured to determine the specific region that is detected within a predetermined range from the position specified by the specifying unit as the region for which the notification process is performed.

8. An image capturing apparatus comprising:
an image capturing unit; and
the apparatus according to claim 5.

9. An apparatus comprising:
one or more processors; and
a memory storing instructions which, when executed by the one or more processors, cause the one or more processors to function as:
an obtaining unit configured to obtain a plurality of first captured images obtained by performing first shooting with a first parameter and motion information about subjects in the plurality of first captured images;
an estimation unit configured to, when second shooting is performed with a second parameter set independent of the first parameter, estimate motion blur of the subjects in a second captured image obtained in the second shooting, from the motion information and the second parameter;
a notification unit configured to perform a notification process corresponding to information about the motion blur;
a specifying unit configured to specify a subject, among the subjects, for which the notification process is performed; and
a determination unit configured to determine a region for which the notification process is performed, based on the specified subject,
wherein
the notification unit is configured to perform the notification process for the determined region,
the specifying unit is a gaze region detection unit configured to detect a gaze region, and
the notification unit is configured to change a display region in the notification process in accordance with a movement direction or a speed of the detected gaze region.

10. A method for an apparatus, the method comprising:
obtaining a plurality of first captured images obtained by performing first shooting with a first parameter and motion information about subjects in the plurality of first captured images;

estimating, when second shooting is performed with a second parameter set independent of the first parameter, motion blur of the subjects in a second captured image obtained in the second shooting, from the motion information and the second parameter;

performing a notification process corresponding to information about the motion blur;

specifying a subject, among the subjects, for which the notification process is performed; and determining a region for which the notification process is performed, based on the specified subject, wherein the notification process is performed for the determined region, in the specifying, detecting a gaze region is performed, the notification process is performed to change a visibility in accordance with at least one of a range over which the detected gaze region moves, a gaze duration, or a distance from the gaze region.

11. The method according to claim 10, further comprising:
detecting a subject region; and
performing the notification process for the detected subject region.

12. The method according to claim 10, further comprising:
specifying a subject by a user operation on a touch panel; and
performing the notification process for the determined region on the specified subject.

13. The method according to claim 10, further comprising:
specifying a position of an autofocus frame by an operation of an operation member; and
performing the notification process for the determined region based on the specified position of the autofocus frame.

14. The method according to claim 10, further comprising:
estimating motion blur for a specific region of the specified subject, the detected specific region based on the specified subject; and
performing the notification process for the specific region based on the estimated motion blur.

15. A method for an apparatus, the method comprising:
outputting, when a shooting instruction is given by a user while a plurality of first captured images are successively output in first shooting performed with a first parameter, in response to the shooting instruction, a second captured image obtained in second shooting performed with a second parameter;
calculating motion information based on the plurality of first captured images;
setting the second parameter independent of the first parameter;
estimating motion blur in the second captured image, based on the motion information and the second parameter;
performing a notification process corresponding to information about the motion blur;
specifying a subject for which the notification process is performed; and
determining a region for which the notification process is performed, based on the specified subject,
wherein
the notification process is performed for the determined region,
in the specifying, detecting a gaze region is performed, and
the notification process is performed to change a visibility in accordance with at least one of a range over which the detected gaze region moves, a gaze duration, or a distance from the gaze region.

16. A non-transitory computer-readable storage medium which stores a program for causing a computer of an apparatus to execute a method, the method comprising:
obtaining a plurality of first captured images obtained by performing first shooting with a first parameter and motion information about subjects in the plurality of first captured images;
estimating, when second shooting is performed with a second parameter set independent of the first parameter, motion blur of the subjects in a second captured image obtained in the second shooting, from the motion information and the second parameter;
performing a notification process corresponding to information about the motion blur;
specifying a subject, among the subjects, for which the notification process is performed; and
determining a region for which the notification process is performed, based on the specified subject,
wherein
the notification process is performed for the determined region,
in the specifying, detecting a gaze region is performed, and
the notification process is performed to change a visibility in accordance with at least one of a range over which the detected gaze region moves, a gaze duration, or a distance from the gaze region.

17. A non-transitory computer-readable storage medium which stores a program for causing a computer of an apparatus to execute a method, the method comprising:
outputting, when a shooting instruction is given by a user while first captured images are successively output in first shooting performed with a first parameter, in response to the shooting instruction, a second captured image obtained in second shooting performed with a second parameter;
calculating motion information based on the plurality of first captured images;
setting the second parameter independent of the first parameter;
estimating motion blur in the second captured image, based on the motion information and the second parameter;
performing a notification process corresponding to information about the motion blur;
specifying a subject for which the notification process is performed; and
determining a region for which the notification process is performed, based on the specified subject,
wherein
the notification process is performed for the determined region,
in the specifying, detecting a gaze region is performed,
the notification process is performed to change a visibility in accordance with at least one of a range over which the detected gaze region moves, a gaze duration, or a distance from the gaze region.

* * * * *